COMPUTER SYSTEM

INVENTORS
SHERRIL A. HARMON
EDWARD A. HERRERA
BY
[signature]
ATTORNEY

BINARY DATA WORD

INSTRUCTION WORD-FULL OPERAND AND QUASI INSTRUCTIONS

INSTRUCTION WORD-GEN 1, GEN 2, AND GEN 3 INSTRUCTIONS

INDEX WORD

TIM/TOM CONTROL WORD

AND-GATE

OR-GATE

INVERTER

NAND-GATE

NOR-GATE

FLIP-FLOP

FULL ADDER

ARITHMETIC AND CONTROL UNIT DATA TRANSFER

TIMING DIAGRAM - TIMING CONTROL UNIT

AUTOMATIC PROGRAM INTERRUPT UNIT

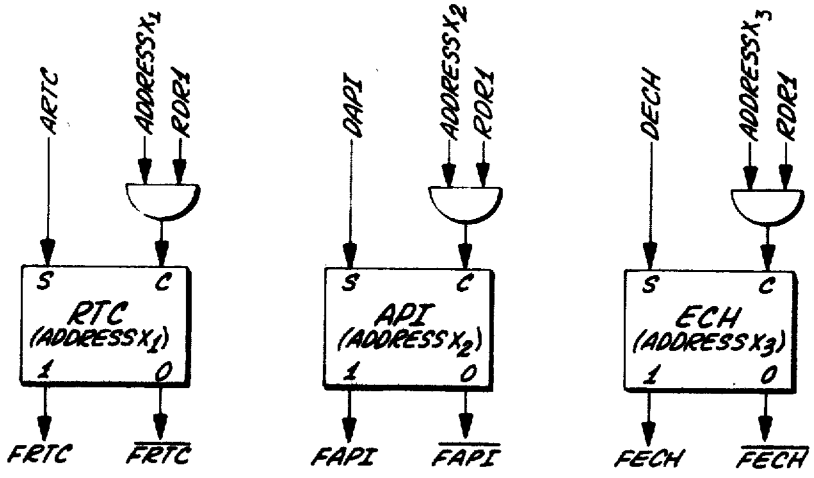
LEVEL CHANGE DETECTOR FLIP-FLOPS
FIG. 9
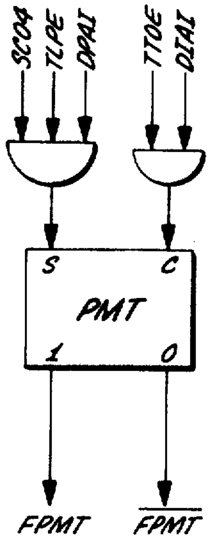
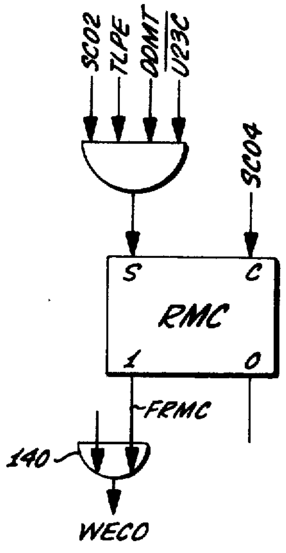
FIG. 10 FIG. 11

TIMING DIAGRAM-INTERRUPT MONITOR

TIMING DIAGRAM-INTERRUPT MONITOR

TIMING DIAGRAM-INTERRUPT MONITOR 3,504,347
Patented Mar. 31, 1970

3,504,347

INTERRUPT MONITOR APPARATUS IN A COMPUTER SYSTEM

Sherril A. Harmon and Edward A. Herrera, Phoenix, Ariz., assignors to General Electric Company, a corporation of New York Filed July 3, 1967, Ser. No. 650,968
Int. Cl. G06f *1/00*
U.S. Cl. 340—172.5 15 Claims

TABLE OF CONTENTS

| | Column |
|---|---|
| ABSTRACT OF THE DISCLOSURE | 1 |
| BACKGROUND OF THE INVENTION | 1 |
| Field of the Invention | 1 |
| Description of the Prior Art | 1 |
| SUMMARY OF THE INVENTION | 2 |
| BRIEF DESCRIPTION OF THE DRAWINGS | 2 |
| DESCRIPTION OF THE PREFERRED EMBODIMENT | 3 |
| Computer System—General | 3 |
| Information Representation | 5 |
| Data words | 5 |
| Instruction words | 6 |
| Auxiliary words | 7 |
| System Circuit Elements | 8 |
| AND-gate | 8 |
| OR-gate | 8 |
| Inverter | 9 |
| NAND-gate | 9 |
| NOR-gate | 10 |
| Flip-flop | 11 |
| Register | 11 |
| Full adder | 12 |
| Computer System—Details | 12 |
| Memory | 13 |
| Arithmetic and control unit | 14 |
| Peripheral input/output buffer | 17 |
| Input/output expander | 17 |
| Timing control unit | 17 |
| Automatic Program Interrupt Unit | 20 |
| Interrupt Monitor—General | 22 |
| Interrupt Monitor—Details | 23 |
| Interrupt Monitor—Operation | 25 |

ABSTRACT OF THE DISCLOSURE

A computer system including a memory, an arithmetic and control unit for executing a main program, apparatus for requesting interruption of execution of the main program and apparatus for receiving such program interrupt requests and selectively permitting interruption of execution of the main program to service the requests. Monitor apparatus is provided to determine whether or not program interrupt requests in the computer system are serviced within predetermined time periods. Detection by the monitor apparatus of a failure of the computer system to properly service an interrupt request results in corrective action initiated by the monitor apparatus.

BACKGROUND OF THE INVENTION

Field of the Invention

This invention relates to computer systems for processing information and, more particularly, to apparatus for controlling the execution of programs in a computer system. Specifically, the invention relates to apparatus for monitoring the servicing of program interrupt requests in a computer system.

Description of the Prior Art

In a computer system, interruption of execution of the main program in the system may be periodically or intermittently requested to permit information transfers between memory and peripheral devices and to allow various other operations to be performed in the system. To insure proper operation of the computer system and to prevent loss of information, it is often necessary that program interrupt requests be honored and serviced within prescribed periods of time. Many events and situations can occur in a computer system to prevent timely servicing of program interrupt requests. For example, the number of program interrupt requests present at a given time under certain circumstances may exceed the capacity of the computer system to service the requests, with the result that the lower-priority interrupt requests are not serviced on a timely basis. Timely servicing of program interrupt requests can also be prevented by program errors. For example, if the free time of the system is being employed to debug new programs, the new program may enter a loop which would interfere with execution of the main program and servicing of program interrupt requests in the system. In some systems, an instruction or command may be employed in the main program to inhibit the servicing of program interrupt requests. Such inhibiting of servicing of program interrupt requests over a long period by means of a program instruction may be undesirable.

Accordingly, it is an object of this invention to provide an improved interrupt arrangement in a computer system.

It is another object of this invention to provide apparatus in a computer system for detecting the failure of an interrupt request to be serviced within a predetermined period of time.

It is another object of this invention to provide apparatus in a computer system responsive to detection of the failure of a program interrupt request to be serviced within a predetermined period of time for permitting the interrupt request to be promptly serviced.

It is a further object of this invention to provide apparatus in a computer system for anticipating the possibility that a given program interrupt request of a selected type will not be serviced before another interrupt request of the same type occurs and for causing the given interrupt request to be promptly serviced.

SUMMARY OF THE INVENTION

The foregoing objects are achieved, in accordance with the illustrated embodiment of the invention, by providing apparatus for monitoring the servicing of predetermined interrupt requests in the system. The interrupt monitor apparatus includes logic gates for receiving predetermined interrupt request signals and the outputs of level change detector flip-flops responsive to these request signals. Each level change detector flip-flop is set to the 1-state at the trailing edge of the corresponding interrupt request signal and is reset when servicing of the interrupt request is initiated in response to the interrupt request signal. Interrupt error signal WDAL issues and flip-flops WD1 and WD2 of the monitor apparatus are set to the 1-state if a level change detector flip-flop corresponding to one of the predetermined interrupt request signals is still set to the 1-state when the leading edge of another such interrupt request signal occurs. When set to the 1-state, flip-flops WD1 and WD2 enable several logic gates and set flip-flop MRI to the 1-state. In the 1-state, flip-flop MRI prevents the memory of the system from being addressed from the I-Register, the P-Register or the Automatic Program Interrupt Unit of the system. Signal MERC issues from logic gates to hold the system in Sequence Control State 1. Address signals DB04 and DB02 are generated by logic gates and transmitted to memory to automatically address memory location $00024_8$, causing the contents of this memory location to be transferred from memory to the Arithmetic and Control Unit. The contents of memory location $00024_8$ initiate corrective action in the computer system to permit the program interrupt request to be promptly serviced.

BRIEF DESCRIPTION OF THE DRAWINGS

The subject matter of the invention is particularly pointed out and distinctly claimed in the concluding portion of the specification. The invention, however, both as to organization and method of operation may best be understood by reference to the following description taken in connection with the accompanying drawings, in which:

FIGURE 9 is a logic diagram illustrating level change detector flip-flops of the automatic program interrupt unit;

FIGURE 10 is a logic diagram illustrating the input signals to flip-flop PMT of the computer system;

FIGURE 11 is a diagram illustrating the logic employed to generate signal WECO in the computer system;

DESCRIPTION OF THE PREFERRED EMBODIMENT

Computer System—General

Figure 1:
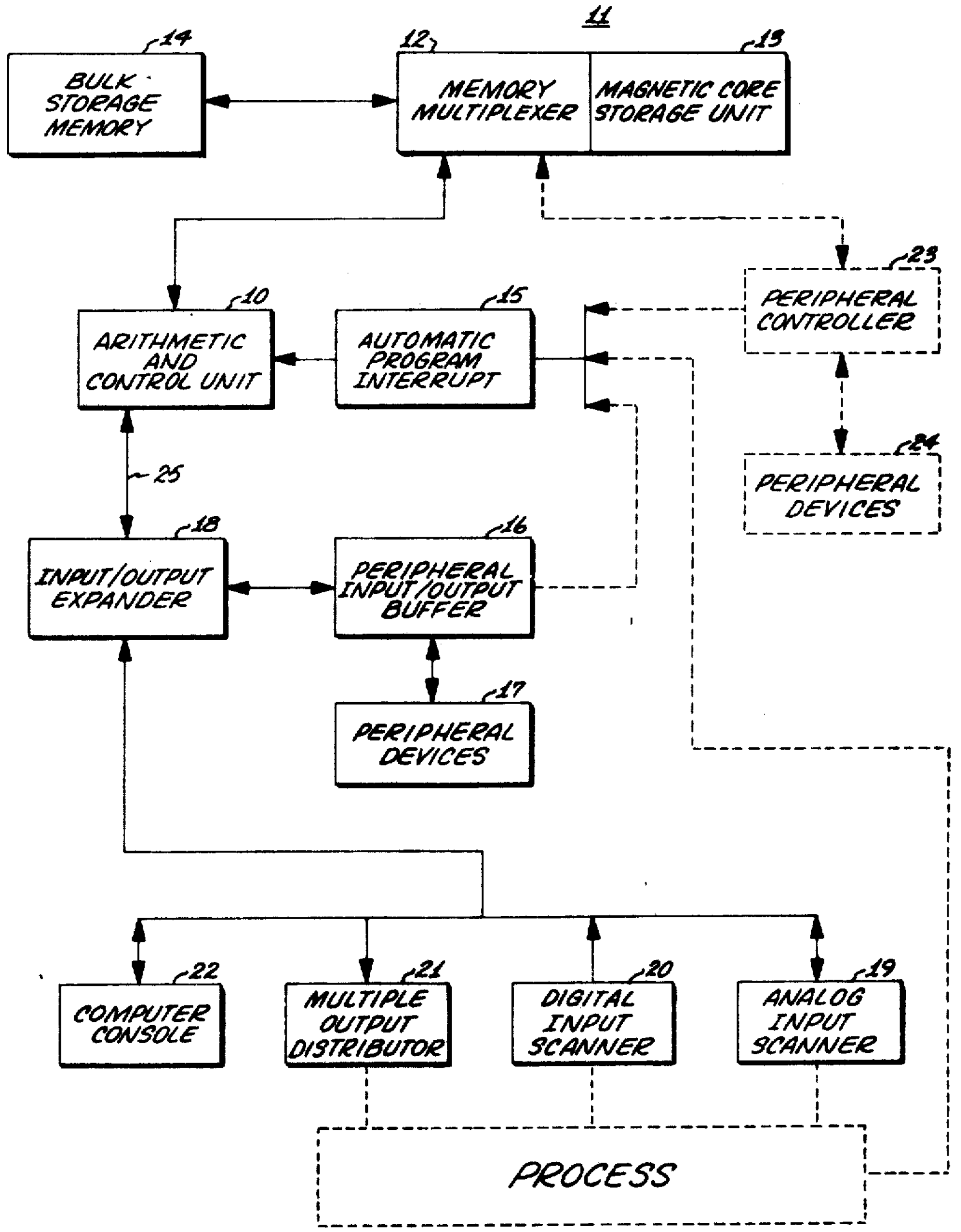
FIGURE 1 is a block diagram of a computer system to which the instant invention is applicable.

FIGURE 1 illustrates diagrammatically a typical computer system organized to control or monitor a process. The major units of the computer system are Arithmetic and Control Unit 10, Memory 11 comprising Memory Multiplexer 12 and Magnetic Core Storage Unit 13, Bulk Storage Memory 14, which may comprise a disc or drum storage unit, Automatic Program Interrupt Unit 15, Input/Output Expander 18, Peripheral Input/Output Buffer 16, Peripheral Devices 17, Analog Input Scanner 19, Digital Input Scanner 20, Multiple Output Distributor 21 and Computer Console 22. Peripheral Devices 17, connected to Peripheral Input/Output Buffer 16, may include, for example, an input/output typer, a logging typer, an alarm typer, a tape or card punch and a tape or card reader. A Peripheral Controller 23 may also be connected to Memory Multiplexer 12 with Peripheral Devices 24 communicating with Memory 11 through Peripheral Controller 23. Peripheral Devices 24 may include, for example, data links, high-speed printers, card readers, card punches, magnetic tape units, or disc storage units. The lines interconnecting the various units illustrated in FIGURE 1 represent symbolically paths of information and control signal transfer in the computer system.

The computer system responds to a plurality of distinct instructions which are supplied in the sequential order necessary to perform particular processing, control and monitoring functions. Magnetic Core Storage Unit 13 of Memory 11 stores data words which are to be processed, data words which are the result of processing, data words representing process parameters and other process information, instruction words and auxiliary words for addressing and control. Memory Multiplexer 12 includes control circuitry to permit transfer of information between Magnetic Core Storage Unit 13 and Arithmetic and Control Unit 10, Bulk Storage Memory 14 and Peripheral Controller 23.

Bulk Storage Memory 14 may comprise drum or disc storage units or magnetic tape storage units used for storing large quantities of information or instruction routines which can be transferred to Magnetic Core Storage Unit 13 as required for use in the computer system.

Arithmetic and Control Unit 10 controls the sequence of events required for instruction execution in the computer system, performs binary arithmetic operations, and serves as a path for transfer of information between Memory 11 and Peripheral Input/Output Buffer 16 and Input/Output Expander 18. Arithmetic and Control Unit 10 contains the logical elements necessary to access Memory 11 and to perform all operations required for instruction execution. Arithmetic and Control Unit 10 communicates with Memory 11 to obtain instruction words, auxiliary words, data words on which operations are to be performed, to store data words on which operations have been performed, to obtain or store data words representing process parameters and other process information and to obtain control signals for synchronizing the timing of Arithmetic and Control Unit 10 with operations in Memory 11.

Peripheral Input/Output Buffer 16 communicates with Arithmetic and Control Unit 10 through Input/Output Expander 18 and serves as a data buffer, translator, and sequencer for Peripheral Devices 17. Peripheral Input/Output Buffer 16 includes a plurality of channels, each connected to one of Peripheral Devices 17 to handle the data transfers between Memory 11 and that device. A plurality of Peripheral Input/Output Buffers may be provided to communicate with Arithmetic and Control Unit 10 through Input/Output Expander 18 when the peripheral device requirements of a specific system exceed the capacity of a single Peripheral Input/Output Buffer.

Input/Output Expander 18 is a communication link between Arithmetic and Control Unit 10 and Peripheral Input/Output Buffer 16 and between Arithmetic and Control Unit 10 and the input and output devices connected to the control and/or monitored process. Input/Output Expander 18 is connected to Arithmetic and Control Unit 10 through I/O Bus 25. Input/Output Expander 18 serves as a multiplexer for digital and analog inputs from the process and as a multiplexer and amplifier for output signals to the process. Signal inputs may be from contact closures, pulse generators, or measuring devices. Input/Output Expander 18 communicates corrective or alarm information to the process to change the process control variables or to activate the proper alarm devices or displays. A plurality of Input/Output Expanders may be connected to Arithmetic and Control Unit 10 if the requirements of the system exceed the capacity of a single Input/Output Expander. Arithmetic and Control Unit 10 employs the control information stored in Memory 11 to decide whether control or alarm actions are required and provides the necessary control or alarm information to Input/Output Expander 18. Input/Output Expander 18 also provides a transfer path for information transmitted between Arithmetic and Control Unit 10 and Peripheral Input/Output Buffer 16.

Analog Input Scanner 19 selects and amplifies process analog sensor signals and also converts analog information into a digital form compatible with that used in Arithmetic and Control Unit 10 and other system elements. The digital output signals of Analog Input Scanner 19 are transmitted to Arithmetic and Control Unit 10 through Input/Output Expander 18.

Digital Input Scanner 20 selects and conditions, by filtering, amplifying and attenuating, contact or digital process inputs. The output signals of Digital Input Scanner 20 are applied to Arithmetic and Control Unit 10 through Input/Output Expander 18. Multiple Output Distributor 21 receives digital, decimal and analog outputs from Input/Output Expander 18 and transmits this information to the controlled and/or monitored process and to operator displays.

Automatic Program Interrupt Unit 15 detects and identifies program interrupt signals from Peripheral Input/Output Buffer 16 and Peripheral Controller 23 indicating that a peripheral device is ready to perform a data transfer. Automatic Program Interrupt Unit 15 also detects signals which indicate condition changes in the controlled and/or monitored process. Upon detection of interrupt request signals, Automatic Program Interrupt Unit 15 causes a word to be transferred to Arithmetic and Control Unit 10 from the memory location identified by the memory address supplied by Automatic Program Interrupt Unit 15, corresponding to the highest priority interrupt request present at that time. This word may be a single instruction word or the first instruction of a subroutine, or may be a control word for directing an information transfer with a peripheral device.

Computer Console 22 provides a communication path between the operator and computer system for programming and maintenance. In addition, Computer Console 22 is provided with visual displays illustrating the instantaneous states of various registers and elements within Arithmetic and Control Unit 10 to aid the operator in monitoring system and program performance.

INFORMATION REPRESENTATION

The computer system of FIGURE 1 stores and processes information represented by the binary code. In the binary code each element of information is represented by a binary digit, sometimes termed a "bit," each binary digit being either a "1" or a "0." In the computer system, a binary "0" is represented by a potential of approximately 0 volt or ground while a binary "1" is represented by a positive potential relative to ground. The fundamental unit of information employed in processing and communication in the described system is the word, each word comprising 24 binary digits. The first binary digit or bit of a data word is termed the most-significant digit (MSD) of the word and is designated as bit 23. The last binary digit of the word is termed the least-significant digit (LSD) of the word and is designated as bit 0. The binary digits between bits 23 and 0 are accorded successively decreasing order of significance.

Three general categories of words are employed in the computer system of FIGURE 1, viz: (1) data words, (2) instruction words, and (3) auxiliary words for address and control. Auxiliary words are of the following types:

(a) index word
(b) TIM/TOM control word

The organization of each type of word is illustrated in FIGURES 2*a*–2*e*.

Data words

Figure 2A:
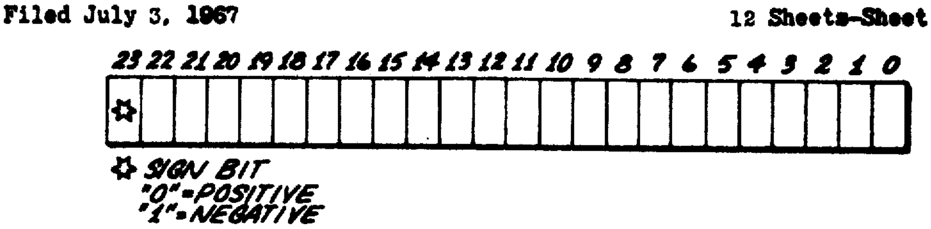
FIGURES 2*a*–2*e* are symbolic diagrams illustrating the organization of the various types of word formats employed in the computer system of FIGURE 1.

Data in the computer system of FIGURE 1 is in fixed-point binary form. Each binary data word represents a single number. The binary digit in bit position 23 of the data word, termed bit 23, identifies the sign of the binary data word. The organization of a binary data word is illustrated in FIGURE 2*a*. Bit 23 is the MSD and bit 0 is the LSD of the binary data word. Bit 0 of the binary data word thus represents $2^0$ and is equal to the decimal number 1, if bit 0 is a binary 1. Bit 1 represents $2^1$ and is equal to the decimal number 2 if bit 1 is a binary 1. Bit 5 represents $2^5$ and is equal to the decimal number 32, if bit 5 is a binary 1. Thus, in general, the (i)th bit of the binary data word represents $2^i$ if the $(i)$th bit is a binary 1. The $(i)$th bit represents 0 if the bit is a binary 0. During information transfers between Memory 10 and certain peripheral devices, the binary data words being transferred are selectively divided into 2 bytes of 12 bits each, 3 bytes of 8 bits each or 4 bytes of 6 bits each.

Positive binary data words are stored and operated upon in true binary while negative binary data words are stored and operated upon in two's complement form. The two's complement of a binary number is its one's complement increased by one. The one's complement of a binary number is the number which results when each binary 1 in the number is replaced by a binary 0 and each binary 0 is replaced by a binary 1. For convenience, a binary word may be more compactly represented by a series of "octal" digits in which each octal digit represents three adjacent binary digits.

Instruction words

Operations for accomplishing processing and control are performed in the computer system under the control of a series of instruction words which are stored in Magnetic Core Storage Unit 13 and executed one at a time. The sequence in which instructions are executed is called the P-Sequence or Program Sequence and is controlled by a counter. Instruction words executed by the computer system of FIGURE 1 are of five types, viz, full operand, quasi, Gen I, Gen II and Gen III instructions.

Figure 2B:
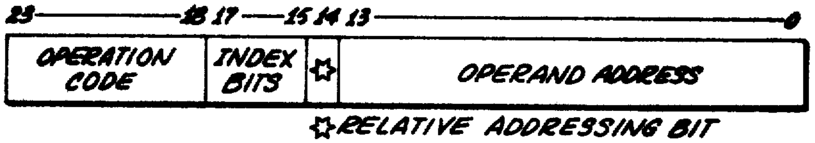

The organization of full operand and quasi instruction words is illustrated in FIGURE 2*b*. Full operand instruction words are most commonly used in the computer system of FIGURE 1. These instructions are used to perform arithmetic operations, logical operations, index control operations, and data transfers to and from Memory 10. The operation code of a full operand instruction word (bits 23–18) identifies the operation or program step to be performed. The operand address field (bits 13–0) designates the address of a storage location in Memory 10 from which a word is to be extracted for processing or control or in which a word is to be stored during execution of the instruction.

Quasi instruction words are utilized to initiate quasi subroutines which perform special functions. The address in Memory 10 of the first instruction word in a quasi subroutine is defined by the operation code of the quasi instruction word. The operand address field of the quasi instruction word is stored in memory during execution of the quasi subroutine.

Bits 15–17 of the instruction word illustrated in FIGURE 2*b* are index bits which are employed to indicate whether the operand address of the instruction word is to be modified by an index quantity and, if index modification is specified, the location in memory of the index quantity. If bits 17–15 of an instruction word are all binary 0's, no index modification will occur when the command word is transferred to Arithmetic and Control Unit 10 for execution. If bits 17–15 are any other possible combination (001–111), the operand address of the instruction word will be modified by adding to it the contents of the memory location designated by the index bits ($00001_8$–$00007_8$).

Modification of the operand address of an instruction word may also be effected under control of bit 14, termed the relative addressing bit, of the instruction word. If bit 14 is a binary 1, the final address of the operand is automatically determined in the computer system relative to the address of the instruction being executed. Relative addressing permits the instructions of a program to address other memory locations by specifying the number of memory locations between the instructiton location and the desired memory location. Programs so written are easily relocated and executed anywhere in memory.

Figure 2C:

The organization of a Gen I, Gen II or Gen III instruction word is illustrated in FIGURE 2*c*. The operation code of the instruction word (bits 23–18) identifies the instruction as a Gen I instruction, a Gen II instruction or a Gen III instruction. Bits 14–0 comprise a microcoded field which is employed to specify a plurality of sub-operations to be performed under control of the operation code. As with the full operand and quasi instructions, the microcoded field may be modified by an index quantity specified by the index bits 17–15. Gen I commands are used primarily to effect bit manipulation within the principal accumulator or A-Register of Arithmetic and Control Unit 10. Gen II commands are employed within the computer system to (a) select peripheral devices, (b) transfer data to or from these devices, and (c) provide for program control transfers as determined by various internal or external conditions to which the system is responsive. Gen III commands are used to manipulate the contents of the principal accumulator or A-Register and the secondary accumulator or Q-Register and to affect other elements within Arithmetic and Control Unit 10.

Auxiliary words

The computer system permits address and modification to materially reduce total processing time and program memory requirements. During instruction processing, the system follows this general sequence:

(1) The instruction word is obtained from memory.

(2) Any address development specified by the indexing bits or the relative addressing bit is performed.

(3) The instruction is executed.

Figure 2D:
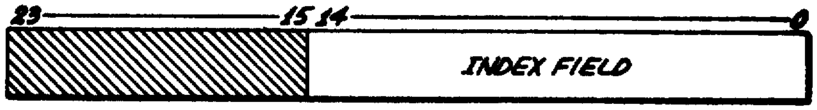

The address development specified by the index bits in step 2 of the above sequence is effected in the computer system by the use of index words. The organization of an index word is illustrated in FIGURE 2*d*. In operand address or microcoded field development employing an index word, the index field (bits 14–0) of the index word is added to the operand address field or microcoded field of the instruction word. The instruction is then executed using the modified operand address or modified microcoded field.

Figure 2E:
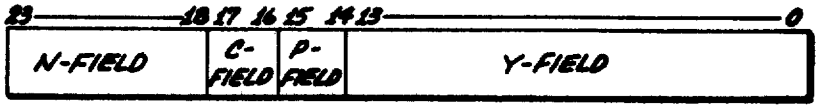

FIGURE 2*e* illustrates another type of auxiliary word, viz a control word employed in executing a TIM operation for transferring information from a peripheral device to Memory 10 or a TOM operation for transferring information to a peripheral device from Memory 10. The N-Field (bits 23–18) of the control word specifies, in ones complement form, the number of words to be transferred between the corresponding peripheral device and Memory 10. The N-Field may specify up to 63 words. The C-Field (bits 17 and 16) of the control word specifies at any given point in time the number of bytes yet to be transferred between the peripheral device and Memory 10 to complete transfer of the current word. The C-Field is initially set to equal the P-Field. The P-Field (bits 15 and 14) specifies, in twos complement form, the number of bytes, one, two, three or four, in each word transferred between the peripheral device and Memory 10, as follows:

| Bit 15 | Bit 14 | Number of bytes per word |
|---|---|---|
| 0 | 0 | 4 |
| 0 | 1 | 3 |
| 1 | 0 | 2 |
| 1 | 1 | 1 |

The Y-Field (bits 13–0) of the control word initially specifies the starting address less one of the group of memory locations to which or from which data is to be transferred.

System Circuit Elements

The functions of circuits useful as elements of the computer system of FIGURE 1 will now be described. Circuits for performing these functions are well known in the art. The following circuits find general employment in the computer system: AND-gates, OR-gates, Inverters, NAND-gates, NOR-gates, Flip-Flops and Full Adders. The symbols illustrated in FIGURES 3*a*–3*g* are employed throughout the drawings to represent the corresponding circuits.

AND-gate

Figure 3A:
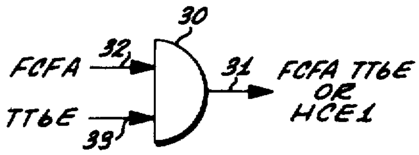
FIGURES 3*a*–3*g* illustrate symbols employed to represent circuit elements in the computer system of FIGURE 1.

The AND-gate provides the logical operation of conjunction for binary 1 signals applied thereto. Since a binary 1 is represented by a relatively positive potential in the system, the AND-gate provides a positive output signal representing a binary 1 when, and only when, all the input signals applied thereto are positive and represent binary 1's. The symbol identified by reference 3 in FIGURE 3*a* represents a two-input AND-gate. Such an AND-gate delivers a binary 1 output signal on output line 31 only when each of the two input signals applied on respective input lines 32 and 33 are binary 1's.

The two input signals applied to AND-gate 30 of FIGURE 3*a* are designated FCFA and TT6E. The output signal of AND-gate 30 is represented by "FCFA TT61," a conjunctive logic expression. This form of expression is used in logic equations, which are also termed Boolean equations, and which are often employed to represent a logical structure. The conjunctive operation on two signals, such as the FCFA and TT6E signals, is indicated by writing the two signal designation terms adjacent to each other with no operator notation between them, as written above, or with the operator notation (·) between the terms, as follows: *FCFA·TT6E*. This conjunctive expression is read as "FCFA and TT6E."

Alternatively, the output of AND-gate 30 may be identified by another signal designation, such as signal designation HCE1 in FIGURE 3*a*. Output signal HCE1 of AND-gate 30 is a binary 1, therefore, only when both input signals FCFA and TT6E are binary 1's. This relationship between the output signal AND-gate 30, the input signals to AND-gate 30, and the logical operation of conjunction performed by AND-gate 30 may be expressed in the form of a logic equation, viz:

$$FCFA\ TT6E = HCE1$$

This logic equation fully represents the conditions necessary to the generation of output signal HCE1 and may be employed to structurally represent the relationship between signal HCE1 and signals FCFA and TT6E.

The logical operation of conjunction is not limited to AND-gates having only two input signals, but instead is applicable to AND-gates having any number of input signals. In each such instance, the output signal of the corresponding AND-gate represents a binary 1 when, and only when, all of the input signals applied to the gate represent binary 1's.

OR-gate

Figure 3B:
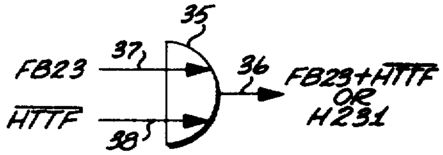

The OR-gate provides the logical operation of inclusive-OR for binary 1 input signals applied thereto. In the computer system, since a binary 1 is represented by a relatively positive signal, the OR-gate provides a positive output signal representing a binary 1 when any one or more of the input signals applied thereto are positive and represent binary 1's. The symbol identified by reference numeral 35 in FIGURE 3*b* represents a two-input OR-gate. Such an OR-gate delivers a binary 1 output signal on output line 36 when either or both input signals applied to input lines 37 and 38 represent binary 1's.

The two input signals applied to OR-gate 35 of FIGURE 3*b* are designated FB23 and $\overline{\text{HTTF}}$. The output signal may be represented by "FB23+$\overline{\text{HTTF}}$," an inclusive-OR disjunctive logic expression. This form of expression is used in logic equations which may be employed to represent logical structures. The inclusive-OR operation on any two signals, such as the FB23 and $\overline{\text{HTTF}}$ signals, is indicated by writing the two signal designation terms adjacent each other with the operator notation (+) between the terms, as written above. This inclusive-OR expression is read as "FB23 or $\overline{\text{HTTF}}$."

Alternatively, the output of OR-gate 35 may be identified by another signal designation, such as signal designation H231 in FIGURE 3*b*. Output signals H231 of OR-gate 35 is a binary 1, therefore, when either or both of input signals FB23 and $\overline{\text{HTTF}}$ are binary 1's. This relaitonship between the output signal of OR-gate 35, the input signals to OR-gate 35 and the logical operation of inclusive-OR performed by OR-gate 35 may be expressed in the form of a logic equation as follows:

$$FB23+\overline{HTTF}=H231$$

This logic equation fully represents the conditions necessary to the generation of output signal H231 and may be employed to structurally represent the relationship between signal H231 and the signals FB23 and $\overline{\text{HTTF}}$.

The logical operation of inclusive-OR is not limited to OR-gates having only two input signals, but instead is applicable to OR gates having any number of input signals. In each such instance, the output signal of the corresponding OR-gate represents a binary 1 when any one or more of the input signals applied to the gate are positive and represent binary 1's.

Inverter

The inverter provides a logical operation of inversion, or NOT, for an input signal applied thereto. The inverter provides a relatively positive output signal, representing a binary 1, when the input signal applied to the inverter is relatively negative, representing a binary 0. Conversely, the inverter provides an output signal representing a binary 0 when the input signal represents a binary 1.

Figure 3C:
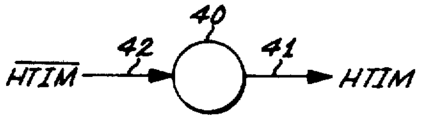

The symbol identified by reference number 40 in FIGURE 3*c* represents an inverter. Inverter 40 delivers a binary 1 output signal on output line 41 when the input signal applied on input line 42 represents a binary 0, and provides a binary 0 output signal on output line 41 when the input signal on line 42 is a binary 1.

The output signal delivered by the inverter is designated as having the inverse binary logical significance of the input signal. The input signal applied to the inverter of FIGURE 3*c* is designated as signal $\overline{\text{HTIM}}$. The output signal of this inverter is therefore designated as signal HTIM, which signifies that the output signal has inverse logical significance compared to the input signal.

This designation for a signal having inverse binary logical significance with respect to another signal is employed generally in the description of the system. Thus, a signal designation, such as $\overline{\text{DNDP}}$, indicates that when the DNDP signal is relatively positive, representing a binary 1, the $\overline{\text{DNDP}}$ signal is relatively negative, representing a binary 0, and vice versa. It is to be understood herein that whenever a particular signal is generated, its logical inverse may be generated by applying the original signal to an inverter.

NAND-gate

Figure 3D:
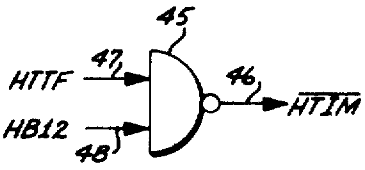

The NAND-gate provides the logical operation of conjunction and inversion for binary 1 signals applied thereto. In the system, since a binary 1 is represented by a positive signal, the NAND-gate provides a relatively negative output signal representing a binary 0 when, and only when, all of the input signals applied to the NAND-gate are positive, representing binary 1's. The symbol identified by numeral 45 in FIGURE 3*d* represents a two input NAND-gate. Such a NAND-gate delivers a binary 0 output signal on output lead 46 only when each of the two input signals applied to input leads 47 and 48 represents a binary 1. The two input signals applied to NAND-gate 45 are designated HTTF and HB12. The output signal of NAND-gate 45 is designated $\overline{\text{HTIM}}$. The logical relation between the output and input signals of NAND-gate 45 may be expressed by the logic equation:

$$\overline{HTTF}\ \overline{HB12}=\overline{HTIM}$$

This logical relation may also be expressed as:

$$\overline{HTTF}+\overline{HB12}=\overline{HTIM}$$

These equations indicate that output signal $\overline{\text{HTIM}}$ is a binary 0 when both input signals HTTF and HB12 are binary 1's. Under all other conditions, output signal $\overline{\text{HTIM}}$ is a binary 1. The logical relation between the output and input signals of NAND-gate 45 may also be expressed in terms of signal HTIM which has inverse logical significance with respect to signal $\overline{\text{HTIM}}$ as follows:

$$HTTF\ HB12=HTIM$$

This equation indicates that output signal HTIM is a binary 1 when both input signals HTTF and HB12 are binary 1's; this is equivalent to saying that output signal $\overline{\text{HTIM}}$ is a binary 0 when both input signals HTTF and HB12 are binary 1's; as previously discussed.

The logical operation of conjunction and inversion is not limited to NAND-gates having only two input signals, but is applicable to NAND-gates having any number of input signals. In each such instance, the output signal of the corresponding NAND-gate represents a binary 0 when, and only when, all of the input signals applied to the NAND-gate represent binary 1's.

NOR-gate

Figure 3E:
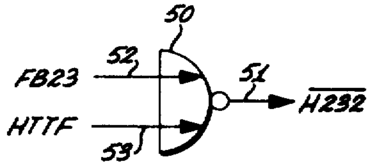

A NOR-gate provides the logical operation of inclusive-or and inversion for binary 1 input signals applied thereto. In the system, since a binary 1 is represented by a positive signal, a NOR-gate provides a relatively negative output signal representing a binary 0 when any one or more of the input signals applied thereto are positive and represent binary 1's. The symbol identified by reference numeral 50 in FIGURE 3*e* represents a two input NOR-gate. Such a NOR-gate delivers a binary 0 output signal on output lead 51 when any one or both of the input signals applied to input leads 52 and 53 represent binary 1's.

The two input signals applied to NOR-gate 50 are designated FB23 and HTTF. The output signal is designated $\overline{\text{H232}}$. The logical relationship between the input and output signals of NOR-gate 50 may be represented by the following equation:

$$\overline{FB23}+\overline{HTTF}=\overline{H232}$$

This equation indicates that output signal $\overline{\text{H232}}$ is a binary 0 when either of input signals FB23 or HTTF are binary 1's. The equation may also be written as:

$$\overline{FB23}\ \overline{HTTF}=\overline{H232}$$

This equation indicates that $\overline{\text{H232}}$ is a binary 1 when both input signals $\overline{\text{FB23}}$ and $\overline{\text{HTTF}}$ are binary 1's, i.e. when both input signals FB23 and HTTF are binary 0's. Under all other conditions, output signal $\overline{\text{H232}}$ is a binary 0. The logical relation between the output and input signals of NOR-gate 50 may also be expressed in terms of signal H232 as follows:

$$FB23+HB12=H232$$

This equation indicates that output signal H232 is a binary 1 or output signal $\overline{\text{H232}}$ is a binary 0 when either of input signals FB23 or HTTF are binary 1's.

The logical operation of inclusive-or and inversion is not limited to NOR-gates having only two input signals, but instead is applicable to NOR-gates having any number of input signals. In each such instance, the output signal of the corresponding NOR-gate represents a binary 0 when any one or more of the input signals applied to the NOR-gate represent binary 1's.

Flip-flop

The flip-flop provides temporary storage of a binary digit of data or control information. A pair of output signals are delivered by the flip-flop to denote the type of binary digit that is currently being stored.

The flip-flop, or bistable multivibrator, is a circuit adapted to operate in either one of two stable states. The flip-flop may be transferred to one or the other of its states in response to suitable input signals to store information. In one of its stable states (1-state), the flip-flop represents a binary 1 and in the other stable state (0-state), the flip-flop represents a binary 0. When the flip-flop is transferred to the 1-state, it is said to be "set." When the flip-flop is transferred to the 0-state, it is said to be "reset."

Figure 3F:
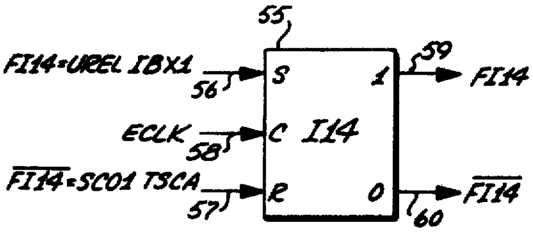

A flip-flop is generally identified mnemonically in accordance with the function it performs. For example, a typical flip-flop employed in the system for control is designated the TTF flip-flop. The TTF designation stands for "TIM/TOM" and the TTF flip-flop, when in the 1-state, indicates that a TIM or a TOM operation is being performed in the system. A typical flip-flop employed in the system for temporary storage of data is the I14 flip-flop. The symbol identified by reference numeral 55 in FIGURE 3*f* is employed to represent a flip-flop. Symbol 55, in this instance, represents the I14 flip-flop.

The I14 flip-flop is employed to temporarily store the fifteenth bit in the I-Register. The two lines 56 and 57 entering the left-hand side of the flip-flop symbol are input lines and provide the two required trigger signals. The line 58 entering the left-hand side of the flip-flop is an input line providing the clock signal required to enable a change in state of the flip-flop. Line 56, the one input line, provides a one input (or "set") signal and line 57, the zero input line, provides a zero input (or "reset") signal. When the one input signal increases positively and the clock signal on input line 58 issues, the flip-flop is transferred to its 1-state (or "set" state), if it is not already in the 1-state. When the zero input signal increases positively and the clock signal on input line 58 issues, the flip-flop is transferred to its 0-state (or "reset" state), if it is not already in the 0-state. The notation *FI*14=*UREL IBX*1 *ECLK* indicates the logical gate structure employed to generate the "set" trigger signal. Similarly, the notation $\overline{FI14}$=*SC*01 *TSCA ECLK* indicates the logical gate structure employed to generate the "reset" trigger signal for the I14 flip-flop.

The two lines 59 and 60 extending from the right-hand side of symbol 55 are output lines that deliver the two output signals, viz FI14 identifying the 1-output signal and $\overline{\text{FI14}}$ identifying the 0-output signal. When the I14 flip-flop is in the 1-state, a relatively positive signal is delivered on the 1-output line while a relatively negative signal is delivered to the 0-output line. Conversely, when the I14 flip-flop is in the 0-state, a relatively negative signal is delivered on the 1-output line and a relatively positive signal is delivered on the 0-output line. Flip-flop circuits are well known in the art and will not here be described in detail.

Register

A register is a set of flip-flops providing temporary storage for a group of related binary digits of data or control information. The size of a register is dependent on the number of binary digits of information to be stored. For example, the A-Register in the Arithmetic and Control Unit 10 of the computer system is employed to temporarily store an information word and therefore comprises twenty-four flip-flops.

The flip-flops of a register are identified according to the register designation and the numerical significance of the information bits stored therein. Thus, a particular flip-flop of a register may be designated as the "0*i*" flip-flop, where "0" identifies the register and "*i*" identifies the order of significance of the bit stored in the flip-flop. For example, flip-flop A23 stores the twenty-fourth or the most-significant bit stored in the A-Register while flip-flop B00 stores the least-significant bit stored in the B-Register. Data movement between the registers of the system is normally by parallel transfer of the bits stored in the flip-flops of one register to predetermined flip-flops of the receiving register. Data movement may also be accomplished by serial shift of bits between certain registers.

Full adder

Figure 3G:
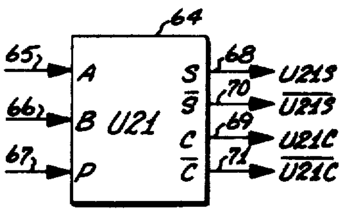

The full adder is employed in the computer system to perform binary arithmetic operations. The symbol identified by reference numeral 64 in FIGURE 3*g* is employed to represent a full adder. Symbol 64, in this instance, represents the U21 full adder. As illustrated in FIGURE 3*g*, the full adder receives three input signals on lines 65, 66 and 67 and provides sum and carry output signals S and C on lines 68 and 69 respectively in addition to complementary sum and carry output signals $\overline{S}$ and $\overline{C}$ on lines 70 and 71 respectively. A plurality of full adder circuits may be employed to perform binary arithmetic operations on two data words each comprising a corresponding plurality of binary digits.

If all three inputs to a full adder are binary 0's, the sum and carry output signals S and C are binary 0's, while the complementary signals $\overline{S}$ and $\overline{C}$ are binary 1's. If one of the full adder input signals is a binary 1, the sum output signal S is a binary 1 and the carry output signal C is a binary 0. If two input signals of a full adder are binary 1's, the sum output signal S is a binary 0 and the carry output signal C is a binary 1. If all three input signals to a full adder are binary 1's, both the sum and carry output signals are binary 1's. The relationship between the input and output signals of a full adder, such as illustrated in FIGURE 3*g*, is represented in the following table:

FULL ADDER CHARACTERISTIC TABLE

| Full-Adder Inputs | | | Full-Adder Outputs | | | |
|---|---|---|---|---|---|---|
| A | B | P | S | $\overline{S}$ | C | $\overline{C}$ |
| 0 | 0 | 0 | 0 | 1 | 0 | 1 |
| 0 | 0 | 1 | 1 | 0 | 0 | 1 |
| 0 | 1 | 0 | 1 | 0 | 0 | 1 |
| 0 | 1 | 1 | 0 | 1 | 1 | 0 |
| 1 | 0 | 0 | 1 | 0 | 0 | 1 |
| 1 | 0 | 1 | 0 | 1 | 1 | 0 |
| 1 | 1 | 0 | 0 | 1 | 1 | 0 |
| 1 | 1 | 1 | 1 | 0 | 1 | 0 |

Referring to FIGURE 3*g*, sum output signal U21S of full adder 64 is a binary 1 and output signal $\overline{\textbf{U21S}}$ is a binary 0 if either one or three inputs to full adder 64 are binary 1's. In all other instances, output signal U21S is a binary 0 and output signal $\overline{\text{U21S}}$ is a binary 1. If either two or three inputs to full adder 64 are binary 1's, carry output signal U21C is a binary 1 and output signal $\overline{\text{U21C}}$ is a binary 0. In all other instances, output signal U21C is a binary 0 and output signal $\overline{\text{U21C}}$ is a binary 1.

Computer System—Details

Figure 4:
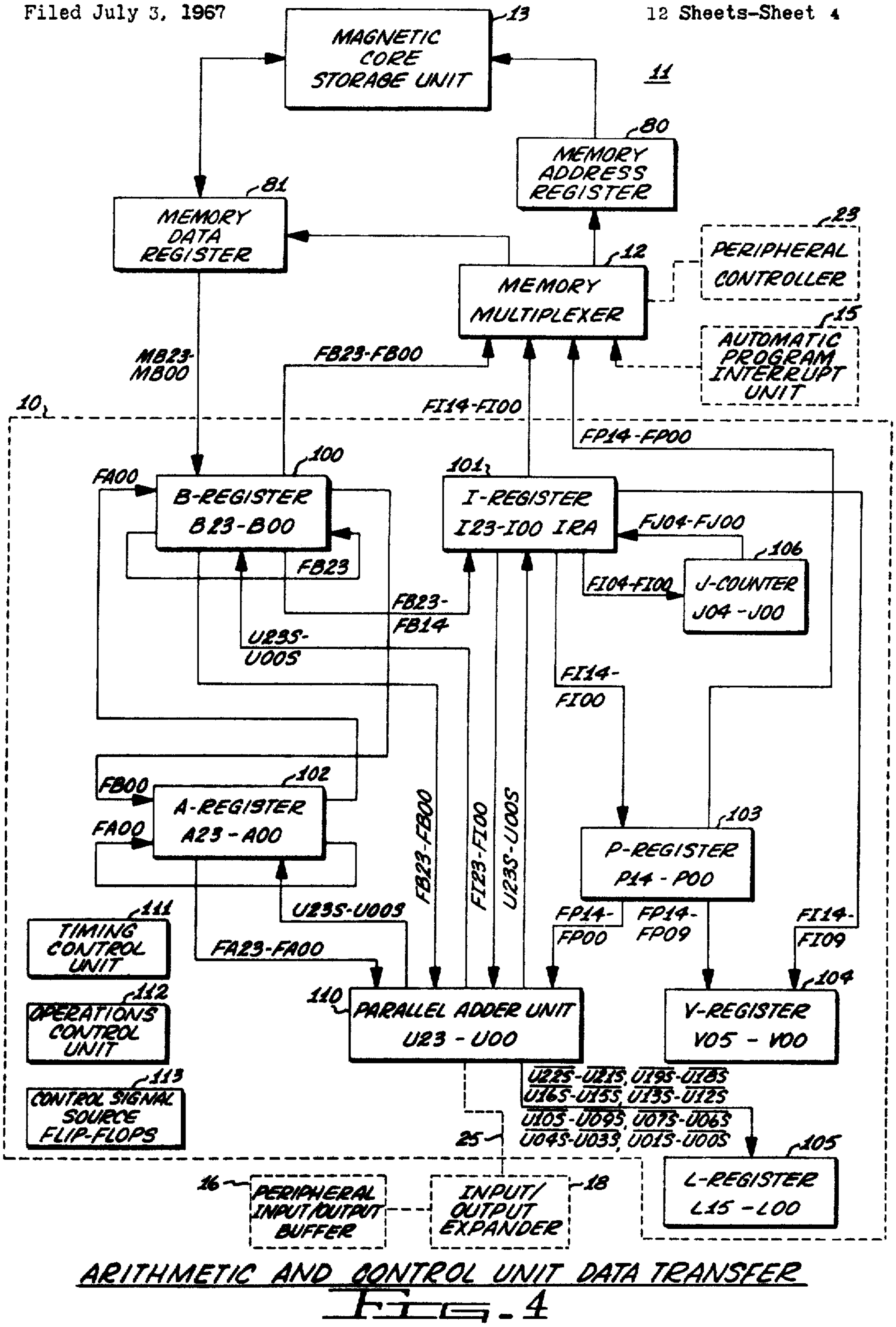
FIGURE 4 is a block diagram illustrating the information storage elements, the information and control signal transfer paths between these elements, and the major control elements of the computer system of FIGURE 1.

The computer system is shown symbolically in FIGURE 4 to illustrate the elements of the system which store data, the paths of data transfer between these elements, and major control elements of the system. Temporary storage of instruction, auxiliary and data words is provided, during processing and control operations, in the various registers of the system. Transfer of data between registers and other elements of the system, as indicated by the interconnecting lines of FIGURE 4, is normally effected by the parallel transfer of binary digits from the source register or element to the receiving register or element.

Memory

Memory 11, illustrated diagrammatically in FIGURES 1 and 4, stores data words which are to be processed, data words which have resulted from processing, data words representing process parameters and other process information, instruction words to direct processing and control and auxiliary words for addressing and control. Memory 11 of the computer system is adapted to store up to 32,768 words of 24 bits each plus a parity bit. Of the memory locations provided for storage of information, the following are reserved for special purposes as indicated in the table:

RESERVED MEMORY LOCATIONS

| Memory Locations (Octal) | Use |
|---|---|
| 00000 | Primary bulk storage memory pointer word. |
| 00001–00007 | Storage of index words for address and microcoded field modification. |
| 00010 | Q-Register (auxiliary arithmetic register). |
| 00011–00017 | Additional bulk storage memory pointer words. |
| 00020 | Memory protect error response location. |
| 00021 | Memory protect, saved I-Register word. |
| 00024 | API Stall Alarm error exit location. |
| 00031–00037 | Peripheral device pointer words. |
| 00040–00077 | Quasi instruction branch vectors or single word quasi. |
| 00100–00177 | Memory protect status words. |
| 00200–00377 | Automatic program interrupt control word storage locations. |

Magnetic Core Storage Unit 13 of Memory 11 utilizes coincident-current storage elements well known in the art. The structure and operation of such storage elements are described, for example, in the publication by C. V. L. Smith, "Electronic Digital Computers," chapter 12, McGraw-Hill Company, Inc., New York, 1959. The location of a word stored in Magnetic Core Storage Unit 13 is identified by the binary number representing the address of the particular storage location in the three-dimensional magnetic core matrix where the word is stored. To obtain information from Memory 11, the appropriate address is supplied to Memory Address Register 80, illustrated in FIGURE 4. Address decode circuits and sense amplifiers (not shown) cause the transfer of the contents of the addressed memory location from Magnetic Core Storage Unit 13 to Memory Data Register 81, as well known in the art, making the data word available to Arithmetic and Control Unit 10.

The extraction of an information word from a storage location of Magnetic Core Storage Unit 13 may change the magnetic state of the individual cores comprising that memory location, destroying the information stored therein. As well known in the art, automatic apparatus is provided to immediately restore to the storage location the information word transferred to Memory Data Register 81.

In storing an information word in Magnetic Core Storage Unit 13, the information word is transferred through Memory Multiplexer 12 from the Arithmetic and Control Unit 10 into Memory Data Register 81. The address of the storage location into which the information word is to be transferred is placed in Memory Address Register 80. The address decode apparatus and inhibit drivers (not shown) of Memory 11 cause transfer of the information word from Memory Register Data 81 to the magnetic cores of the addressed storage location of Magnetic Core Storage Unit 13, as well known in the art.

Memory Address Register 80, illustrated in FIGURE 4, is a 15-bit register forming part of Memory 11 which receives a 15-bit address through Memory Multiplexer 12 specifying the storage location of Magnetic Core Storage Unit 13 from which or to which an information word is to be transferred via Memory Data Register 81. Memory Data Register 81 also forms part of Memory 11 and is a 24-bit register for temporarily storing an information word which is to be stored in Magnetic Core Storage Unit 13 during a memory write operation or which has been received from Magnetic Core Storage Unit 13 during a memory read operation. Information words are transferred from Arithmetic and Control Unit 10 to Memory Data Register 81 through Memory Multiplexer 12 while information words stored in Memory Data Register 81 during a memory read operation are transferred directly to the Arithmetic and Control Unit 10, as illustrated in FIGURE 4.

During a memory read operation, Memory 11 provides signal MDRY to Arithmetic and Control Unit 10 when the information word from the addressed memory location is available in Memory Data Register 81. Signal MRLS is provided to Arithmetic and Control Unit 10 by Memory 11 when the memory read or write operation is completed. Signals MDRY and MRLS serve to synchronize operations in Arithmetic and Control Unit 10 with operations in Memory 11.

Arithmetic and control unit

Arithmetic and Control Unit 10 exercises operational control over the computer system in response to a plurality of distinct instructions which are supplied thereto from Memory 11 in the sequential order necessary to perform a particular processing or control operation. The information which is processed by Arithmetic and Control Unit 10 is supplied primarily from Memory 11. This information is usually transferred into and out of Memory 11 under control of Arithmetic and Control Unit 10.

Arithmetic and Control Unit 10 comprises registers for temporarily storing data, logic circuits for transferring data through and between registers and flip-flops employed as control signal sources. Arithmetic and Control Unit 10 further includes a timing control unit for controlling the timing of the operations performed by Arithmetic and Control Unit 10 and an operations control unit for directing operations performed by Arithmetic and Control Unit 10. FIGURE 4 illustrates diagrammatically the elements of Arithmetic and Control Unit 10 which store data, the paths of data transfer between these elements and certain control elements. Arithmetic and Control Unit 10 comprises the following registers, shown in FIGURE 4: B-Register 100, I-Register 101, A-Register 102, P-Register 103, V-Register 104, L-Register 105 and J-Counter 106. Arithmetic and Control Unit 10 also includes Parallel Adder Unit 110, Timing Control Unit 111, Operations Control Unit 112 and control signal source Flip-Flops 113. Transfer of information between the registers and parallel adder unit of Arithmetic and Control Unit 10 and other elements of the computer system, as indicated by the interconnecting lines of FIGURE 4, is normally effected by parallel transfer of binary digits from the source element to the receiving element. The basic characteristics and functions of the registers and other elements are summarized below as a basis for the more detailed discussion of the invention.

B-Register 100 is a 24-bit register comprising Flip-Flops B23–B00. B-Register 100 stores all instruction and data words being transferred to or from Memory 11. During the transfer of an instruction word from Memory 11 to Arithmetic and Control Unit 10, the operation code, index bits and relative addressing bit of the instruction word are transferred in parallel from B-Register 100 to I-Register 101 while the address field of the instruction word is transferred in parallel from B-Register 100 to Parallel Adder Unit 110. The entire contents of B-Register 100 may also be transferred in parallel to Parallel Adder Unit 110. In transferring information from Arithmetic and Control Unit 10 to Memory 11, the information word in B-Register 100 is transferred in parallel to Memory Multiplexer 12. Information is thus transferred in parallel from B-Register 100 to Memory Multiplexer 12, I-Register 101 and Parallel Adder Unit 110.

B-Register 100 is adapted to receive, by parallel transfer, the contents of Memory Data Register 81 and the output of Parallel Adder Unit 110. B-Register 100 may serve as an extension of A-Register 102 when performing a left or right shift. During a left shift, the contents of either Flip-Flop B22 or B23 of B-Register 100, as specified by the instruction word, are transferred to Flip-Flop A00 of A-Register 102. During a right shift, the contents of Flip-Flop A00 of A-Register 102 are transferred to either Flip-Flop B22 or B23 of B-Register 100, as specified by the instruction word. During a multiplication operation, B-Register 100 stores the multiplier and upon completion of the multiplication operation, holds the least-significant bits of the product. During a division operation, B-Register 100 holds the least-significant bits of the dividend and, upon completion of the division operation, stores the quotient. The contents of B-Register 100 are shifted left circular during a TIM or TOM input or output operation. During a left circular shift, the binary digit stored in Flip-Flop B23 of B-Register 100 is transferred to Flip-Flop B00 as the contents of B-Register 100 are shifted left circular through one bit position.

I-Register 101 is a 25-bit register for storing the instruction word which is to be executed by Arithmetic and Control Unit 10. I-Register 101 comprises Flip-Flops I23–I00 and IRA. The extra bit position has as its purpose the provision of relative addressing capability. The operation code of the instruction word may have any one of a plurality of bit configurations, each configuration directing a fundamentally different processing or control operation in the computer system. I-Register 101 is adapted to receive, by parallel transfer, the contents of Flip-Flops B23–B14 of B-Register 100, the output of Parallel Adder Unit 110 and the contents of J-Counter 106. The contents of I-Register 101 are applied in parallel to Parallel Adder Unit 110. The information stored in Flip-Flops I14–I09 is applied in parallel to V-Register 104. Similarly, the contents of Flip-Flops I14–I00 are applied in parallel to P-Register 103 while the contents of Flip-Flops I04–I00 are applied to J-Counter 106. During the multiplication operation, I-Register 101 stores the multiplicand and during a division operation stores the divisor.

A-Register 102 is a 24-bit register comprising Flip-Flops A23–A00. A-Register 102 is adapted to receive, by parallel transfer, the output of Parallel Adder Unit 110. The contents of A-Register 102 are also applied in parallel to the inputs of Parallel Adder Unit 110. A-Register 102 stores the augend during an add operation, the minuend during a subtract operation and the sum or difference upon completion of the operation. During a multiplication operation, A-Register 102 stores the partial product and during a divide operation stores the twenty-four most-significant bits of the dividend. Upon completion of a multiplication operation, A-Register 102 stores the twenty-four most-significant bits of the product and upon completion of a divide operation stores the 24-bit remainder. As described in conjunction with B-Register 100, A-Register 102 may be shifted left or right. In addition, A-Register 102 may be shifted with the information being transmitted to Flip-Flop A23 for each bit position shifted, being derived from Flip-Flop A00 or other flip-flop of A-Register 102. During a left shift, the contents of flip-flop A23 are lost.

P-Register 103 is a 15-bit counter comprising Flip-Flops P14–P00. The sequence in which successive instructions are executed is controlled by P-Register 103 which serves as a program counter. The count in P-Register 103 is used to provide the address of instruction worns in memory ann is advanced in response to execution of an instruction to form the address of the next instruction to be executed. The amount by which the P-Register count is advanced is determined by the type of action required in Arithmetic and Control Unit 10 as follows:

(a) Normal Program Sequence—count in P-Register advanced by 1.

(b) Jump—count in P-Register advanced by 2.

(c) Branch—P-Register is set to quantity specified by the address field of the branch instruction.

P-Register 103 is adapted to receive by parallel transfer information from Flip-Flops I14–I00 of I-Register 101. The contents of P-Register 103 may be transferred in parallel to Memory Multiplexer 12 and to Parallel Adder Unit 110. The contents of Flip-Flops P14–P09 of P-Register 103 are transferred to V-Register 104.

V-Register 104 is a 6-bit register comprising Flip-Flops V05–V00. V-Register 104 is termed the status word address or the volume register and stores the address of one of 64 protect status words utilized in protecting the contents of Magnetic Core Storage Unit 13. V-Register 104 is adapted to receive, by parallel transfer, information from either P-Register 103 or I-Register 101. During addressing of Memory 11, the contents of V-Register 104 are employed to determine whether or not the appropriate protect status word is available to identify the protect status of the addressed memory location.

L-Register 105 is a 16-bit register comprising Flip-Flops L15–L00. L-Register 105 is employed to store the appropriate protect status word which identifies the protect status for eight 64-word blocks of memory locations in Magnetic Core Storage Unit 13. L-Register 105 is adapted to receive, by parallel transfer, the output of selected bits of Parallel Adder Unit 110. J-Counter 106 is a 5-bit binary counter comprising Flip-Flops J04–J00. J-Counter 106 is normally employed to count shifts during shift operations in Arithmetic and Control Unit 10 and is also used during multiply and divide operations. J-Counter 106 is capable of receiving, by parallel transfer, information from I-Register 101. The contents of J-Counter 106 may be transferred in parallel to I-Register 101.

The Q-Register of Arithmetic and Control Unit 10 comprises memory location $00010_8$ of Magnetic Core Storage Unit 13 and is an auxiliary register used to assist A-Register 102 in performing arithmetic and logical operations. The Q-Register is used to store the multiplier and the least-significant bits of a product during a multiplication operation. During a division operation, the Q-Register stores the least-significant bits of the dividend and quotient. The Q-Register may be utilized in conjunction with A-Register 102 to form a double-length register which may be shifted left or right. The contents of the Q-Register may be directly affected by certain instructions.

Parallel Adder Unit 110 is a conventional 24-bit parallel adder which performs all arithmetic operations in Arithmetic and Control Unit 10. Parallel Adder Unit 110 is capable of receiving, by parallel transfer, the contents of B-Register 100, I-Register 101, A-Register 102 and P-Register 103. The output of Parallel Adder Unit 110 may be applied to B-Register 100, I-Register 101, A-Register 102 and L-Register 105. Parallel Adder Unit 110 also serves as a buffer during input/output operations involving data transfers with peripheral Input/Output Buffer 16 and Input/Output Expander 18. During input/output operations, Parallel Adder Unit 110 receives inputs from I/O Bus 25 and applies its output to I/O Bus 25.

Figure 5:
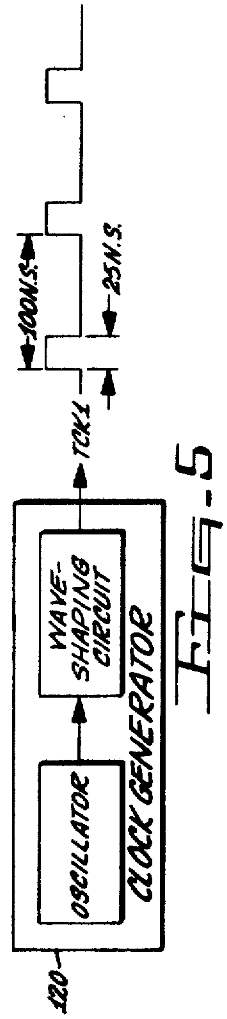
FIGURE 5 is a block diagram illustrating the organization of the clock generator employed in the computer system of FIGURE 1 and illustrating the wave form of the basic clock signal provided by the clock generator for use in the system.
Figure 6:
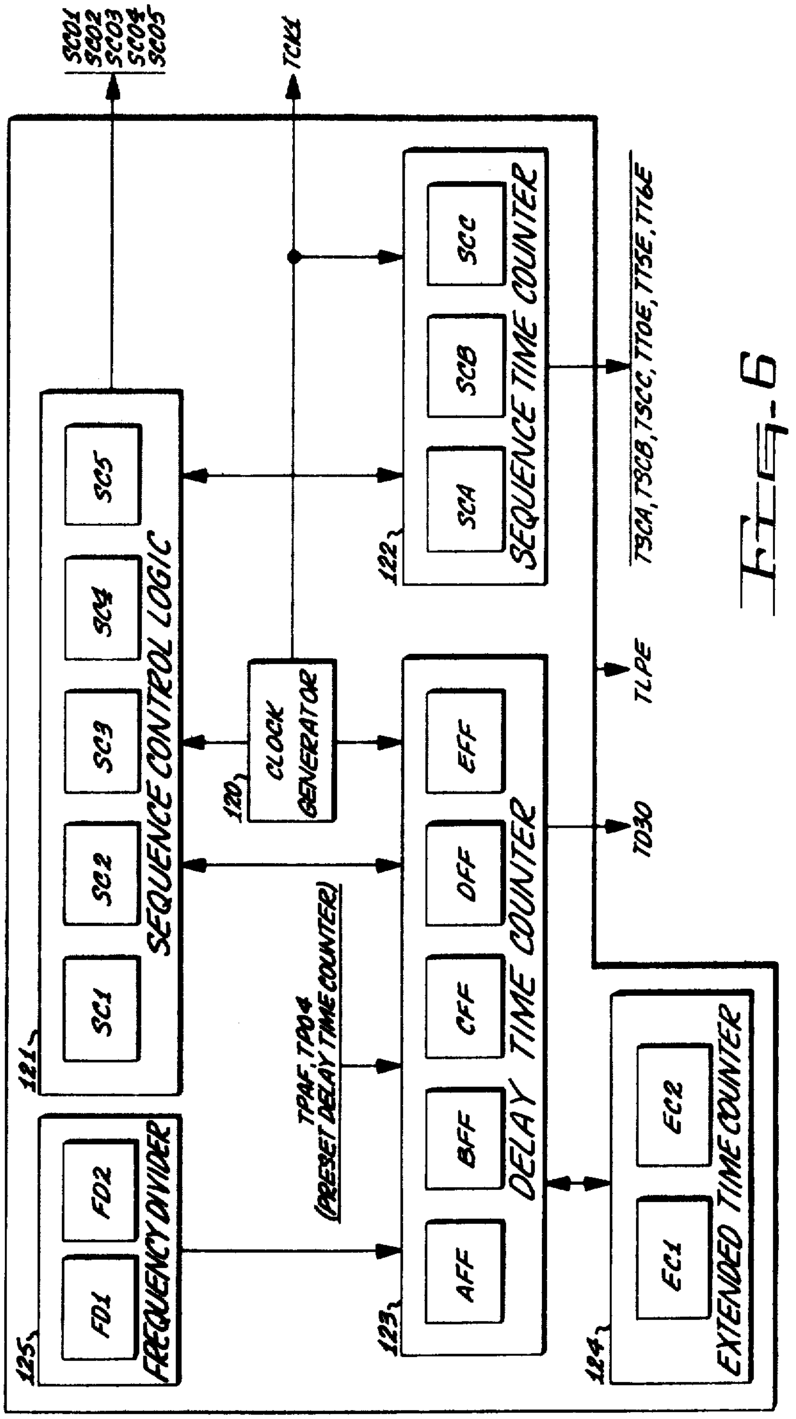
FIGURE 6 is a block diagram illustrating the details of the Timing Control Unit of the Arithmetic and Control Unit in the system of FIGURE 1.

Timing Control Unit 111 provides timing signals to control the sequence and time of occurrance of events in Arithmetic and Control Unit 10. The details of Timing Control Unit 111 are illustrated in FIGURES 5 and 6.

Operations Control Unit 112 is responsive to Timing Control Unit 111, to the operation code of instruction words in I-Register 101 and to initiation of input/output operations by Automatic Program Interrupt Unit 15 and provides the necessary gating and logic signals to cause appropriate operations and information transfers to occur in Arithmetic and Control Unit 10 to execute the instruction or perform the input/output operation. Control signal source flip-flops 113 comprise various flip-flops which temporarily store signals employed in the operation of Arithmetic and Control Unit 10.

Peripheral input/output buffer

The Peripheral Input/Output Buffer 16 of the computer system comprises a plurality of channels for providing information transfer paths between Arithmetic and Control Unit 10 and peripheral devices of the computer system. Each channel is connected to one peripheral device and provides data transfer in one direction between Arithmetic and Control Unit 10 and the peripheral device. Peripheral Input/Output Buffer 16 also includes control logic circuitry for directing the operation of Peripheral Input/Output Buffer 16 and the transfer of information through the channels of Buffer 16 between the peripheral devices and Arithmetic and Control Unit 10, as known in the art. The control logic circuitry receives signals from Arithmetic and Control Unit 10 identifying the operation to be performed in Peripheral Input/Output Buffer 16 and the channel in which the data transfer is to occur. When a peripheral device connected to Peripheral Input/Output Buffer 16 requires information from Arithmetic and Control Unit 10, or is ready to transfer information to Arithmetic and Control Unit 10, the control logic circuitry of Peripheral Input/Output Buffer 16 provides an appropriate program interrupt request signal to Automatic Program Interrupt Unit 15 identifying the channel which requires the program interrupt. Peripheral Input/Output Buffer 16 thus serves to control information transfers between Arithmetic and Control Unit 10 and the connected peripheral subsystem and initiates interruption of the main program in the computer system when a data transfer is required by a connected peripheral device.

Input/output expander

Input/Output Expander 18 of the computer system comprises a plurality of channels for providing test information, control information and data transfer paths between Arithmetic and Control Unit 10 and Peripheral Input/Output Buffer 16 and between Arithmetic and Control Unit 10 and the elements of the system associated with the controlled and/or monitored process. Input/Output Expander 18 also includes logic circuitry for directing information transfers through Expander 18 in an orderly manner. The communication of data and test and control information from Arithmetic and Control Unit 10 to the process is effected by Gen II instructions. Similarly, the transfer of information from the process to Arithmetic and Control 10 occurs through execution of Gen II instructions by the system. The channel of Input/Output Expander 18 employed in an information transfer is selected by channel identification signals transmitted to Input/Output Expander 18. Timing within Input/Output Expander 18 is provided by NPHA and NPHB signals generated in Arithmetic and Control Unit 10.

Timing control unit

Movement of information between the registers of Arithmetic and Control Unit 10 and other operations are performed in relative synchronism under control of a common timing or clock generator. This clock generator may conveniently be a stable oscillator coupled with a suitable wave-shaping circuit to produce a train of uniformly spaced rectangular pulses designated clock pulses. FIGURE 5 is a block diagram representing the clock generator 120 and illustrates the wave form of the basic clock signal TCK1 employed in the computer system. As shown in FIGURE 5, the basic clock signal of the computer system comprises a series of pulses spaced from each other in time by a period of 100 nanoseconds, the clock rate being 10 megacycles. The individual pulses of the pulse train have an approximate width of 25 nanoseconds.

To control and maintain an orderly and efficient succession of operations within Arithmetic and Control Unit 10, Sequence Control Logic 121, as illustrated in FIGURE 6, is provided. Sequence Control Logic 121 comprises five sequence control flip-flops designated SC1, SC2, SC3, SC4 and SC5 to define five mutually exclusive sequence control states. The sequence control states designated by flip-flop SC1 is identified by output signal SC01 of Sequence Control Logic 121. Similarly, the sequence control states designated by flip-flops SC2, SC3, SC4 and SC5 are identified by output signals SC02, SC03, SC04 and SC05 respectively of Sequence Control Logic 121. Sequence Control Logic 121 receives clock signals TCK1 from Clock Generator 120 and is responsive to output signals from Sequence Time Counter 122 and Delay Time Counter 123 in defining the timing of the sequence control states.

During Sequence Control State 1, the instruction word stored in the memory location of Magnetic Core Storage Unit 13 identified by the program count in P-register 103 is transferred from Memory Data Register 81 through B-Register 100 to I-Register 101 of Arithmetic and Control Unit 10. In addition, the program count in P-Register 103 may be incremented if instruction execution is completed in Sequence Control State 1, and other information movement between other registers may occur. A few instructions which can be completed by a simple group of operations are completely executed during Sequence Control State 1. Relative addressing, when specified by the relative addressing bit 14 of full operand and quasi-instructions, is performed during Sequence Control State 1.

Sequence Control State 2, when required, is entered immediately following Sequence Control State 1. During Sequence Control State 2, any index modification of the instruction word operand address field required by the index bits of the instruct-word is performed. Certain full operand instructions also utilize Sequence Control State 2 to partially execute the instruction.

Sequence Control State 3 is normally entered following Sequence Control States 1 or 2 during execution of certain instructions and during performance of a TIM or a TOM operation.

Sequence Control State 4 is normally entered following Sequence Control States 1, 2 or 3, depending upon the nature of the instruction or operation being executed. Sequence Control State 4 is entered during execution of most instruction words and during performance of a TIM or a TOM operation. Sequence Control State 4 may be extended in time as required for certain commands and operations.

Sequence Control State 5 is entered after Sequenc Control State 4 for certain instructions and is utilized for performing additional functions required by certain instructions and operations. Execution of these instructions and performance of a TIM or TOM operation is completed during Sequence Control State 5.

The timing control signals required to control the sequence of events within each sequence control state and for providing timely changes from one sequence control state to another are generated primarily by Sequence Time Counter 122 comprising flip-flops SCA, SCB and SCC. Sequence Time Counter 122 receives clock signals TCK1 from Clock Generator 120 and is responsive to output signals of Sequence Control Logic 121 and also provides signals to Sequence Control Logic 121. The states of flip-flops SCA, SCB and SCC define specific time intervals in which various operations are performed. The relationship between the states of flip-flops SCA, SCB and SCC and the six different time intervals specified by Sequence Time Counter 122 are illustrated in the following table:

| SCA | SCB | SCC | Time (Output Signal) |
|---|---|---|---|
| 0 | 0 | 0 | Time 0 envelope (TT0E). |
| 0 | 0 | 1 | Time 1 envelope (TT1E). |
| 0 | 1 | 1 | Time 2 envelope (TT2E). |
| 1 | 1 | 1 | Time 3 envelope (TT3E). |
| 1 | 1 | 0 | Time 4 envelope (TT4E). |
| 1 | 0 | 0 | Time 5 envelope (TT5E). |
| 1 | 0 | 1 | Time 6 envelope (TT6E). |

The Time 0, Time 1, Time 2, Time 3, Time 4 and Time 5 envelopes are common to each sequence control state. The Time 6 envelope is entered only during execution of certain instructions, namely the Gen I, Gen II, Gen III multiply and divide instructions, and during performance of TIM or TOM operations.

Figure 7:
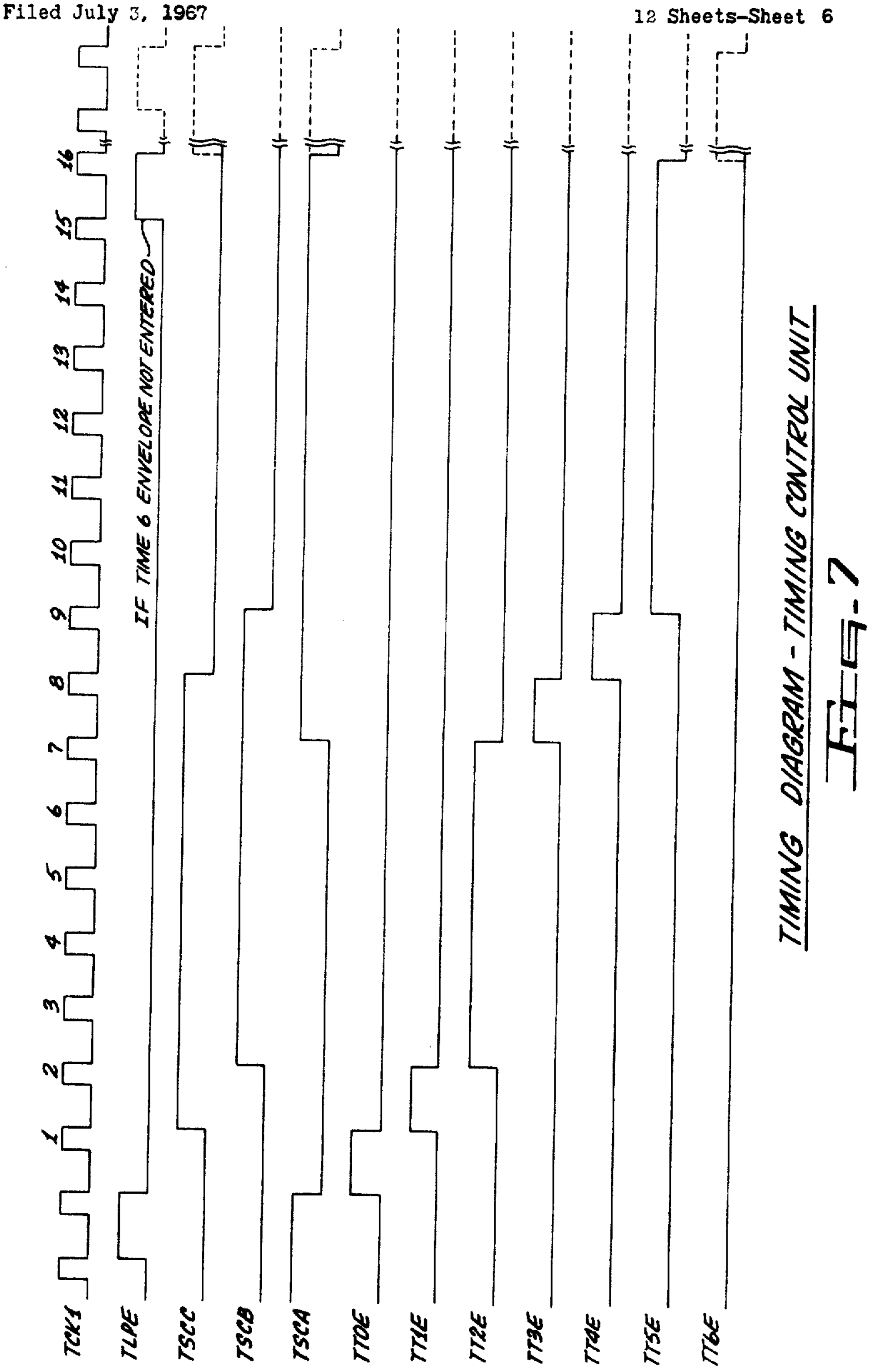
FIGURE 7 is a timing diagram illustrating the relationship of the timing signals generated in the Timing Control Unit of the computer system.

FIGURE 7 illustrates the relationship between the clock signal TCK1 provided by Clock Generator 120 and the output signals of Sequence Time Counter 122. Signal TLPE is normally generated by Timing Control Unit 111 at the end of Time 5 envelope or, alternatively, if Time 6 envelope is entered, at the end of Time 6 envelope, as illustrated in FIGURE 7.

Delay Time Counter 123 comprises flip-flops AFF, BFF, CFF, DFF and EFF and is employed to provide timing within the Time 6 envelope when the Time 6 envelope is entered during execution of certain instructions and operations. Delay Time Counter 123 thus provides timing during extension the normal duration of Sequence Control State 4. During sequence control states in which Time 6 envelope is not entered, Delay Time Counter 123 is reset to $30_8$ and is inhibited from being incremented. During Time 6 envelope, Delay Time Counter 123 may be preset to $30_8$ in response to signal TPAF and subsequently changed to a count of $4_8$ by signal TP04 in order to provide time intervals of appropriate length within Time 6 envelope. Output Signal TD30 of Delay Time Counter 123 issues during Time 6 envelope when the count of Delay Time Counter 123 reaches $30_8$. Delay Time Counter 123 receives clock signals TCK1 from Clock Generator 120 and also receives signals from Sequence Control Logic 121 and Frequency Divider 125.

Extended Time Counter 124 cooperates with Delay Time Counter 123 to designate timing intervals during Time 6 envelope. The first of such time intervals is identified as the period during which flip-flop EC1 is set to the 1-state and flip-flop EC2 is reset to the 0-state. The second of such time intervals is identified as the period during which flip-flop EC1 is reset to the 0-state and flip-flop EC2 is set to the 1-state. The change in states of flip-flops EC1 and EC2 of Extended Time Counter 124 is controlled by Delay Time Counter 123 and occurs when the count in Delay Time Counter 123 reaches $30_8$ during Time 6 envelope.

Frequency Divider 125 comprises flip-flops FD1 and FD2 and serves to adjust the counting rate of Delay Time Counter 123 in accordance with the rate at which information bits are being transmitted between Arithmetic and Control Unit 10 and a peripheral device. If a peripheral device has a high data transfer rate and is connected to a high speed channel of Peripheral Input/Output Buffer 16, Delay Time Counter 123 is responsive to each clock pulse TCK1 provided by Clock Generator 120, with the result that Delay Time Counter 123 counts 20 clock pulses advancing from a count of $4_8$ to a count of $30_8$ in 2 microseconds. If the peripheral device being communicated with has a low data transfer rate and is connected to a low speed channel, Frequency Divider 125 causes Delay Time Counter 123 to count every fourth clock pulse provided by Clock Generator 120, with the result that Delay Time Counter 123 advances from a count of $4_8$ to a count of $30_8$ in response to 80 clock pulses provided by Clock Generator 120 to define a time period of 8 microseconds.

Automatic Program Interrupt Unit

Automatic Program Interrupt Unit 15 of the computer system of FIGURE 1 receives program interrupt requests from various sources in the computer system. Interrupt requests are transmitted to Automatic Program Interrupt Unit 15 in response to predetermined events, requirements or conditions in the system which require performance of a particular operation or series of operations. Each of the program interrupt requests transmitted to Interrupt Unit 15 is assigned a priority relative to all other interrupt requests. Interrupt Unit 15 scans or searches for program interrupt requests in the order of priority, commencing with the highest-priority program interrupt request source. Upon detection of an interrupt request, Automatic Program Interrupt Unit 15 generates a memory address associated with the detected program interrupt request, the memory storage location identified by the generated memory address containing an instruction word or a control word for directing the operation required by the interrupt request or containing the first instruction of a subroutine for servicing the interrupt request. Execution of the main program is suspended while the interrupt request is serviced, the system subsequently continuing execution of the main program.

Program interrupt requests in the computer system are classified as either inhibitable or non-inhibitable requests. Inhibitable requests are those which are prevented from interrupting the main program when flip-flop PMT is reset to the 0-state. The state of flip-flop PMT determines whether or not Automatic Program Interrupt Unit 15 will scan for inhibitable interrupt requests, inhibitable interrupt requests being by-passed during the scan operation if flip-flop PMT is reset to the 0-state. The state of flip-flop PMT is controlled by program instructions. The Permit Automatic Interrupt (PAI) instruction sets flip-flop PMT to the 1-state to permit recognition of inhibitable program interrupt requests by Automatic Program Interrupt Unit 15. The Inhibit Automatic Interrupt (IAI) instruction, causes flip-flop PMT to be reset to the 0-state, preventing recognition of inhibitable program interrupt requests in Automatic Program Interrupt Unit 15. Non-inhibitable program interrupt requests are not affected by the state of flip-flop PMT.

Figure 8:
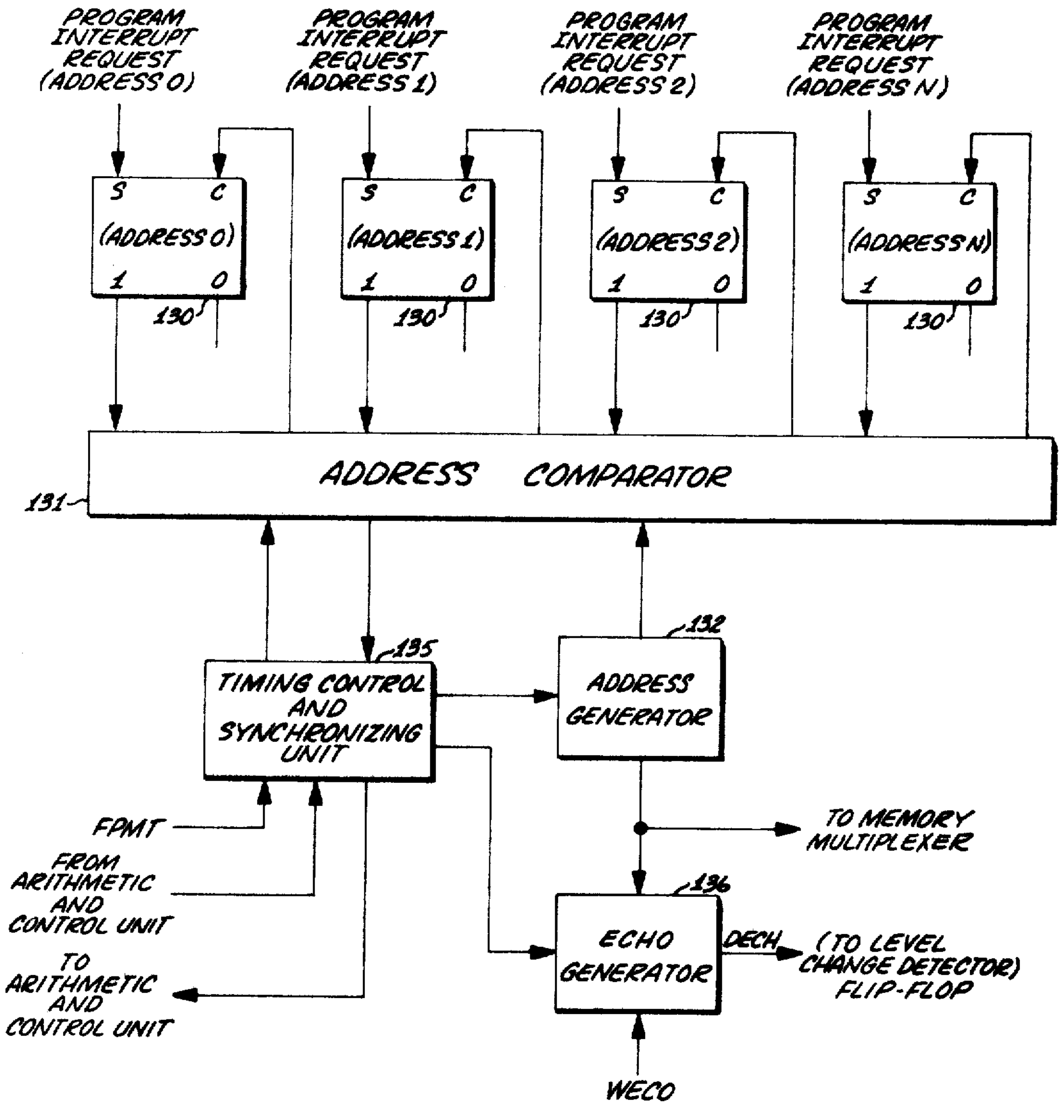
FIGURE 8 is a block diagram illustrating the major components of the automatic program interrupt unit of the computer system of FIGURE 1.

As illustrated in FIGURE 8, each program interrupt request transmitted to Automatic Program Interrupt Unit 15 is applied to a corresponding level change detector flip-flop 130. A differentiating circuit, as known in the art, is employed to provide the set trigger input to each of flip-flops 130 so that each of flip-flops 130 is set to the 1-state in response to the falling edge of an interrupt request signal applied to its input terminals through the differentiating circuit. As indicated in FIGURE 7, each flip-flop 130 is designated by a particular address 0, 1, 2 . . . N, the flip-flop designated "address 0" corresponding to the highest-priority interrupt request and the flip-flop designated "address N" corresponding to the lowest-priority interrupt request. The lower-priority addresses are normally assigned to inhibitable program interrupt requests.

The 1-output signal of each of flip-flops 130 is applied to Address Comparator 131. The output of Address Generator 132 is also applied to Address Comparator 131. Address Generator 132 generates in sequence successive addresses 0, 1, 2 . . . N, commencing with address 0. Upon detecting coincidence between the 1-output signal of a flip-flop 130 and the address output of Address Generator 132, Address Comparator 131 provides an output signal to Timing, Control and Synchronizing Unit 135. Unit 135 causes Address Generator 132 to terminate the scan and provide an address output through Memory Multiplexer 12 to Memory 11 to Echo Generator 136, identifying the program interrupt request detected by Address Comparator 131. The address output of Address Generator 132 applied to Memory Multiplexer 12, termed the interrupt response address, is employed to transfer the contents of the addressed memory location to Arithmetic and Control Unit 10, the contents of this memory location being employed to service the detected program interrupt request.

Timing, Control and Synchronizing Unit 135 provides an output through Address Comparator 131 to change detector flip-flops 130 to reset to the 0-state the flip-flop 130 storing the program interrupt request being serviced. Unit 135 also provides for communication between Arithmetic and Control Unit 10 and Automatic Program Interrupt Unit 15 of the computer system. Unit 15 transmits a signal to Arithmetic and Control Unit 10 requesting interruption of execution of the main program when an interrupt request has been detected by Address Comparator 131. Unit 135 receives from Arithmetic and Control Unit 10 various timing and control information, in addition to signal FPMT representing the state of flip-flop PMT. If signal FPMT is a binary 1, Unit 135 permits Address Generator 132 to scan for both inhibitable and non-inhibitable interrupt requests. If signal FPMT is a binary 0, Unit 135 causes Address Generator 132 to limit its scan to addresses corresponding to inhibitable interrupt requests.

Echo Generator 136 receives signal WECO from Arithmetic and Control Unit 10, in addition to the address output of Address Generator 132 and control signals from Unit 135. Signal WECO indicates the existence of a predetermined condition in the system, viz. decrementation of a counter in the system from a count of 0 to a count of —1. If this condition arose upon execution of an instruction during servicing of a program interrupt request, Echo Generator 136 generates interrupt request signal DECH, interrupt signal DECH being applied to a corresponding one of level change detector flip-flops 130.

FIGURE 9 illustrates level change detector flip-flops RTC, API and ECH of Automatic Program Interrupt Unit 15 which are employed in conjunction with the interrupt monitor apparatus of the invention. Selected ones of flip-flops 130 of FIGURE 7 may be employed as flip-flops RTC, API and ECH. Level change detector flip-flop RTC is set to the 1-state at the falling edge of clock signal ARTC, a line frequency signal at a frequency of, for example, 60 cycles per second provided in the system. The memory location identified by the interrupt response address generated by Automatic Program Interrupt Unit 15 in response to the interrupt request represented by output signal FRTC of flip-flop RTC contains a Decrement Memory Test (DMT) instruction. This instruction is employed to subtract one from the contents of the memory location identified in the address field of the DMT instruction word, this memory location being employed as a real-time clock in the computer system to provide real-time information, for example time of day. Flip-flop RTC is reset to the 0-state in response to an output from Address Generator 132 of Automatic Program Interrupt Unit 15 identifying the RTC flip-flop priority address and signal RDR1 indicating that the interrupt request is being serviced in Arithmetic and Control Unit 10.

Level change detector flip-flop API is set to the 1-state in response to interrupt request signal DAPI originating from an appropriate source, for example a peripheral unit. The contents of the memory location identified by Address Generator 132 of Automatic Program Interrupt Unit 15 upon detection of output signal FAPI contains a control word, an instruction word, of the first instruction of a subroutine employed to service the interrupt request. Flip-flop API is reset to the 0-state in response to an output of Address Generator 132 identifying the priority address of flip-flop API and signal RDR1 indicating that the program interrupt request represented by signal FAPI is being serviced in Arithmetic and Control Unit 10.

Level change detector flip-flop ECH is set to the 1-state in response to echo signal DECH provided by Echo Generator 136 of Automatic Program Interrupt Unit 15. As described earlier, signal DECH issues when a counter in memory, for example the real-time counter decremented by the DMT instruction in response to an interrupt initiated by signal ARTC, has been decremented from 0 to —1 in response to a DMT instruction executed during servicing of a program interrupt request. The storage location of memory identified by the address provided in Address Generator 132 of Automatic Program Interrupt Unit 15 in response to the interrupt request represented by signal FECH contains an instruction or the first instruction of a subroutine which is employed to preset the counter to its initial count. Flip-flop ECH is reset to the 0-state in response to an address output of Address Generator 132 corresponding to the priority address of flip-flop ECH and signal RDR1 indicating that the interrupt request is being serviced in Arithmetic and Control Unit 10.

Flip-flop PMT and its associated input gates are illustrated in FIGURE 10. Flip-flop PMT is set to the 1-state in response to signal DPAI, indicating that the Permit Automatic Interrupt instruction word has been transferred to I-Register 101 and is being executed, when signal TLPE occurs during sequence control state 4 (SC04). Flip-flop PMT is reset to the 0-state during Time 0 envelope (TT0E) when the Inhibit Automatic Interrupt instruction word is transferred to I-Register 101 and executed (DIAI). The 1-output signal of flip-flop PMT is applied to Timing, Control and Synchronizing Unit 135 of Automatic Program Interrupt Unit 15 to either permit or prevent the detection of inhibitable program interrupt requests.

FIGURE 11 illustrates the generation of echo signal WEC0 in Arithmetic and Control Unit 10. Flip-flop RMC is set to the 1-state during execution of the Decrement Memory and Test (DMT) instruction in the computer system when signal TLPE issues during Sequence Control State 2 (SC02) if no carry occurs from bit position 23 of Parallel Adder Unit 110 ($\overline{\text{U23C}}$), indicating that the contents of the memory location identified by the instruction word have been decremented from a value of 0 to a value of —1. Output signal FRMC of flip-flop RMC is applied to OR-gate 140 to generate echo signal WEC0 which is applied to Echo Generator 136 of Automatic Program Interrupt Unit 15. Flip-flop RMC is reset to the 0-state during Sequence Control State 4 (SC04).

Interrupt Monitor—General

Figure 12:
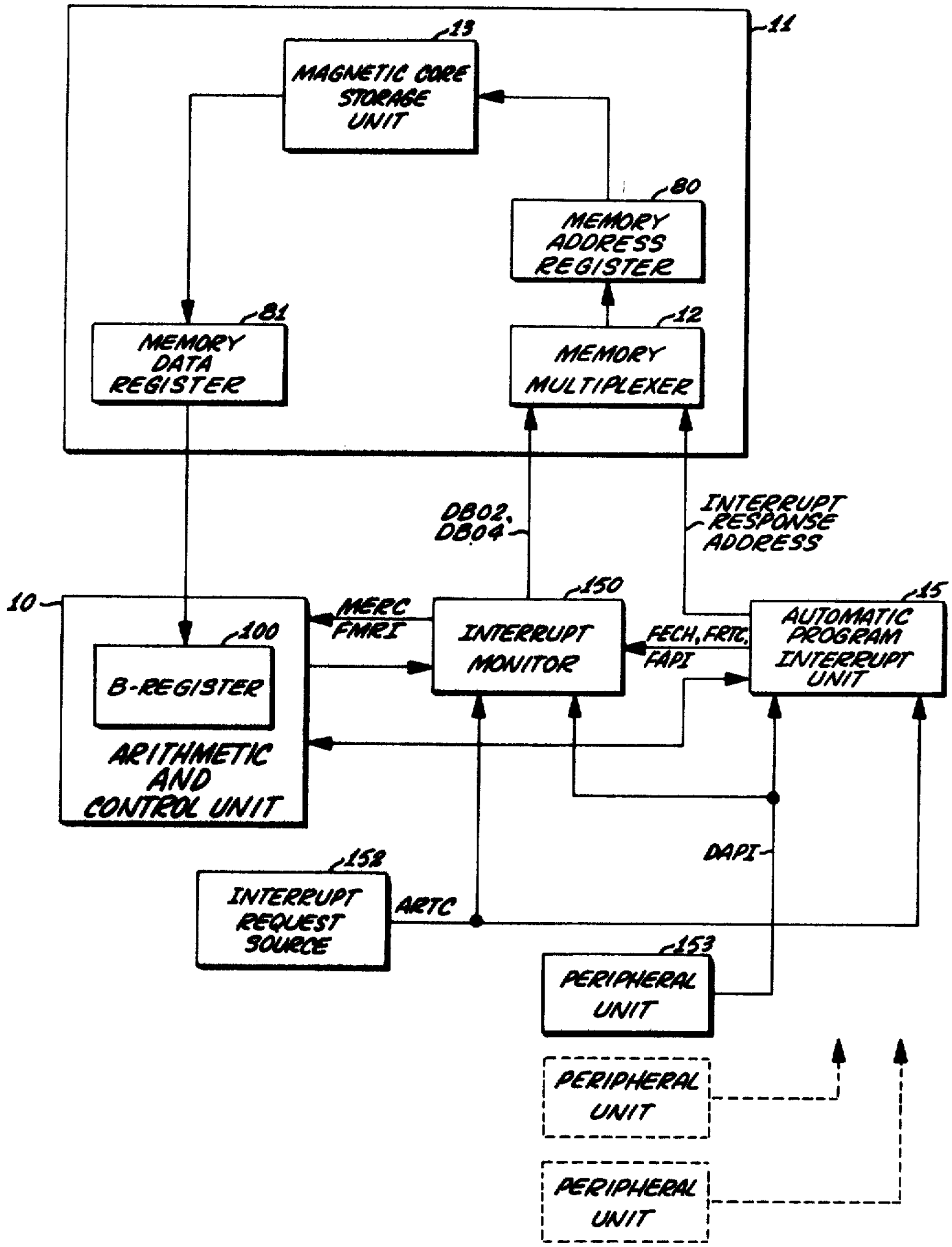
FIGURE 12 is a block diagram illustrating interrupt monitor apparatus of the invention in relation to other major components of the computer system.

FIGURE 12 illustrates diagrammatically the interrupt monitor apparatus of the invention in conjunction with portions of the computer system of FIGURE 4 related to the operation of the interrupt monitor apparatus. Interrupt Monitor 150 receives from Automatic Program Interrupt Unit 15 the output signals of predetermined level change detector flip-flops, viz level change detector flip-flops ECH, RTC and API, as represented by signals FECH, FRTC and FAPI, respectively. In addition, Interrupt Monitor 150 receives clock signal ARTC from Interrupt Request Source 152 and interrupt request signal DAPI from peripheral unit 153. Peripheral unit 153 comprises a peripheral device and a peripheral channel of a peripheral input/output buffer for transmitting information to or receiving information from Memory 11. Interrupt Monitor 150 receives timing and control signals from Arithmetic and Control Unit 10 and transmits to Arithmetic and Control Unit 10, upon detection of the failure of a program interrupt request to be serviced within a predetermined period, signals MERC and FMRI indicating such a failure. In addition, Interrupt Monitor 150 transmits to Memory Address Register 80 through Memory Multiplexer 12 signals DB02 and DB04 identifying a predetermined storage location in Magnetic Core Storage Unit 13 of Memory 11, viz storage location $00024_8$. In response to signals DB02 and DB04, the contents of the predetermined storage location are transferred from Magnetic Core Storage Unit 13 to B-Register 100 of Arithmetic and Control Unit 10. The contents of the predetermined storage location normally comprise a Save Place and Branch (SPB) instruction which causes information critical to the main program to be stored and initiates a branch to a corrective subroutine which sets flip-flop PMT, permitting inhibitable program interrupt requests to be serviced. In operation, in response to detection of the failure of a program interrupt request to be serviced within a predetermined time, Interrupt Monitor 150 interrupts the main program being executed in the system and permits the interrupt request to be serviced prior to occurrence of another similar interrupt request, in order to avoid loss of information in the system.

Interrupt Monitor—Details

Figure 13:
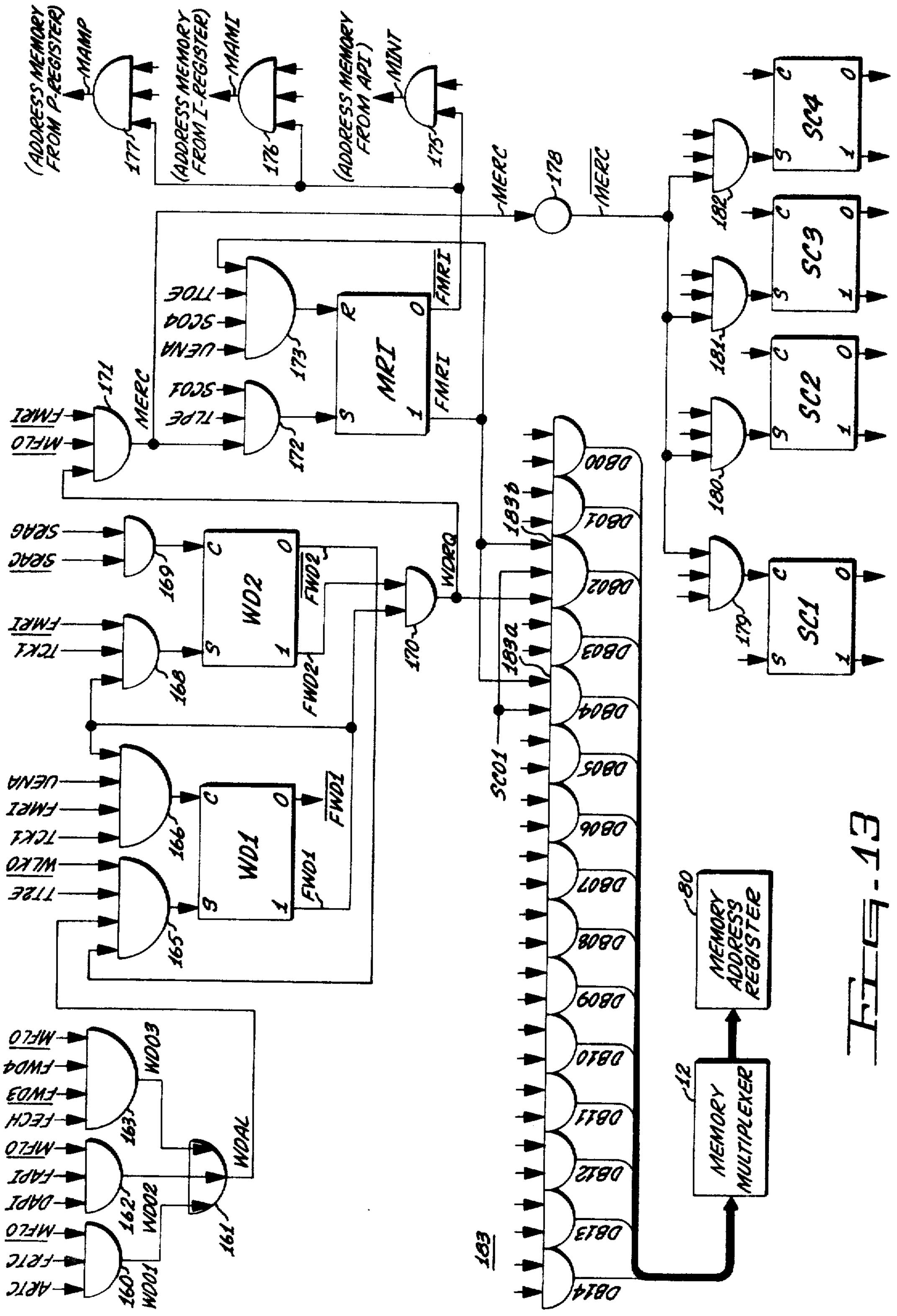
FIGURE 13 illustrates diagrammatically the logic structure of the interrupt monitor apparatus of the invention.

FIGURE 13 illustrates the logic structure of Interrupt Monitor 150 of FIGURE 11. Referring to FIGURE 13, AND-gate 160 receives signals ARTC from Interrupt Request Source 152, FRTC from level change detector flip-flop RTC, and $\overline{MFLO}$, the latter signal originating in Arithmetic and Control Unit 10 to enable operation of Interrupt Monitor 150. If signal $\overline{MFLO}$ is a binary 0, gate 160 is disabled and Interrupt Monitor 150 is rendered inoperative. Output signal WD01 of AND-gate 160 is applied to OR-gate 161. AND-gate 162 receives as inputs signals DAPI from a peripheral unit, FAPI from level change detector flip-flop API and $\overline{MFLO}$. Output signal WD02 of AND-gate 162 is applied to OR-gate 161.

AND-gate 163 receives input signals FECH from level change detector flip-flop ECH, $\overline{FWD3}$, FWD4 and $\overline{MFLO}$. Output signal WD03 of AND-gate 163 is also applied as an input to OR-gate 161. The input signals to each of AND-gates 160, 162 and 163 represent a condition indicating failure of a particular program interrupt request to be serviced within a predetermined period of time with resulting potential loss of information in the system. Additional gates may be provided to detect other similar conditions involving other program interrupt requests.

Output signal WDAL of OR-gate 161 is applied along with signals TT2E, $\overline{WLKO}$ and $\overline{FWD2}$ to AND-gate 165. The output signal of AND-gate 165, when enabled, sets flip-flop WD1 to the 1-state. Flip-flop WD1 is reset to the 0-state when AND-gate 166 is enabled in response to clock signal TCK1, output signal FMRI of flip-flop MRI, signal UENA identifying Sequence Control State 4 during execution of an SPB instruction, and output signal FWD1 of flip-flop WD1.

Flip-flop WD2 is set to the 1-state in response to enabling of AND-gate 168 by clock signal TCK1, output signal $\overline{FMRI}$ of flip-flop MRI and output signal FWD1 of flip-flop WD1. Flip-flop WD2 is reset to the 0-state in response to enabling of AND-gate 169 by signals $\overline{SRAC}$ and SRAG which indicate that a program interrupt request has been serviced and that the system is functioning correctly.

Flip-flops WD1 and WD2 are thus both set to the 1-state in response to detection of the failure of a monitored program interrupt request to be serviced within a predetermined period of time. Flip-flop WD1 is normally reset to the 0-state shortly thereafter, while flip-flop WD2 remains set to the 1-state. Input signal $\overline{FWD2}$ to AND-gate 165 prevents flip-flop WD1 from again being set to the 1-state until the interrupt error condition detected by the interrupt monitor has been corrected and flip-flop WD2 is again reset to the 0-state.

Output signals FWD1 and FWD2 of flip-flops WD1 and WD2 respectively are applied to AND-gate 170. Output signal WDRQ of AND-gate 170 indicates an interrupt error in Interrupt Monitor 150 and is applied to AND-gate 171 along with signal $\overline{MFLO}$ and output signal $\overline{FMRI}$ of flip-flop MRI. Output signal MERC of AND-gate 171 enables AND-gate 172 during Sequence Control State 1 (SC01) in response to signal TLPE, the output signal of AND-gate 172 setting flip-flop MRI to the 1-state. Flip-flop MRI is reset to the 0-state when AND-gate 173 is enabled in Sequence Control State 4 (SC04) during execution of an SPB instruction (UENA) at Time 0 envelope (TT0E).

When flip-flop MRI is set to the 1-state in response to output signal WDRQ of AND-gate 170, output signal $\overline{FMRI}$ is a binary 0, inhibiting the generation of signal MINT by AND-gate 175. Signal $\overline{FMRI}$ also inhibits generation of signals MAMI and MAMP in AND-gates 176 and 177. Signals MINT, MAMI and MAMP cause Memory 11 of the computer system to be addressed from Automatic Program Interrupt Unit 15, from I-Register 101, and from P-Register 103 respectively. Signal $\overline{FMRI}$ thus prevents Memory 11 from being normally addressed from these sources and thus causes interruption of normal operation of the system and of execution of the main program.

Output signal MERC of AND-gate 171 is applied to inverter 178, output signal $\overline{MERC}$ of inverter 178 being applied to AND-gates 179, 180, 181 and 182 which serve as input gates to sequence control logic flip-flops SC1, SC2, SC3 and SC4. When output signal MERC of AND-gate 171 is a binary 1, output signal $\overline{MERC}$ of inverter 178 is a binary 0, inhibiting AND-gates 179, 180, 181 and 182 to prevent sequence control logic flip-flop SC1 from being cleared and to prevent flip-flop SC2, SC3 and SC4 from being set. The computer system is thus forced to remain in Sequence Control State 1 until the SPB instruction is obtained from memory storage location $24_8$, transferring control to a corrective action subroutine for correction of the interrupt error detected by Interrupt Monitor 150.

Memory Address Gates 183 selectively receive memory address information from Automatic Program Interrupt Unit 15, I-Register 101 and P-Register 103, as required by the system, and transfer such memory addresses to Memory Address Register 80 through Memory Multiplexer 12. However, when flip-flop MRI is set to the 1-state, transmission of memory address information from these sources is inhibited. In response to output signal FMRI of flip-flop MRI when MRI is set to the 1-state and signal SC01 identifying Sequence Control State 1, AND-gate 183*a* is enabled to provide memory address output signal DB04. Similarly, in response to output signal WDRQ of AND-gate 170, output signal FMRI of flip-flop MRI when MRI is set to the 1-state and signal SC01 identifying Sequence Control State 1, AND-gate 183*b* is enabled to provide memory address output signal DB02, as illustrated in FIGURE 12. Signals DB02 and DB04 are transmitted to Memory Address Register 80 through Memory Multiplexer 12 to address memory storage location $00024_8$ which contains an SPB instruction. This SPB instruction is transferred through Memory Data Register 81 to B-Register 100 of Arithmetic and Control Unit 10 and serves to direct the system to a subroutine for correcting the interrupt error detected by Interrupt Monitor 150.

Figure 14:
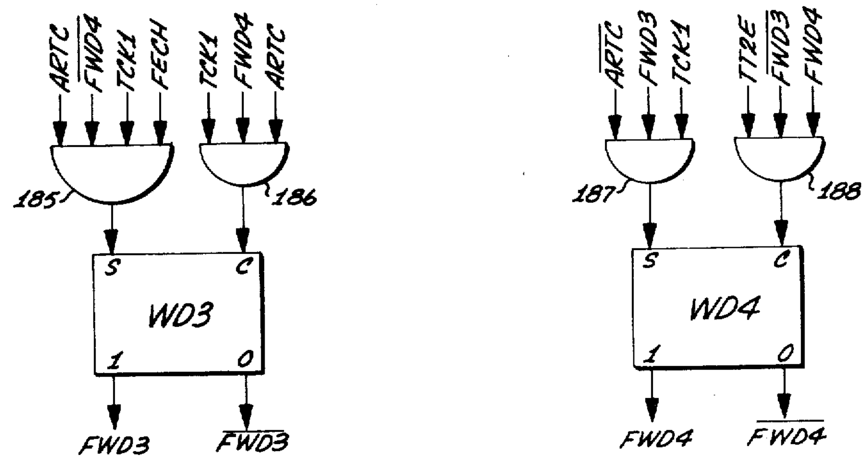
FIGURE 14 illustrates timing flip-flops employed in the interrupt monitor apparatus of the invention.

FIGURE 14 illustrates timing flip-flops WD3 and WD4 and associated input logic employed in conjunction with AND-gate 163, illustrated in FIGURE 13. Flip-flop WD3 is set to the 1-state in response to enabling of AND-gate 185 by output signal FECH of level change detector flip-flop ECH, clock signal TCK1, signal $\overline{FWD4}$ indicating that timing flip-flop WD4 is reset to the 0-state and 60 cycle per second clock signal ARTC. Flip-flop WD3 is reset to the 0-state by the output signal of AND-gate 186 when enabled by clock signal TCK1, output signal FWD4 of timing flip-flop WD4 and the leading edge of 60 cycle per second clock signal ARTC.

Timing flip-flop WD4 is set to the 1-state in response to the output signal of AND-gate 187 when enabled by clock signal TCK1, output signal FWD3 of timing flip-flop WD3, and the inverse of the 60 cycle per second clock signal represented by $\overline{ARTC}$. Flip-flop WD4 is reset to the 0-state in response to the output signal of AND-gate 188 when enabled by signal combination $\overline{FWD3}$ FWD4 during Time 2 envelope (TT2E).

Interrupt Monitor—Operation

Figure 15:
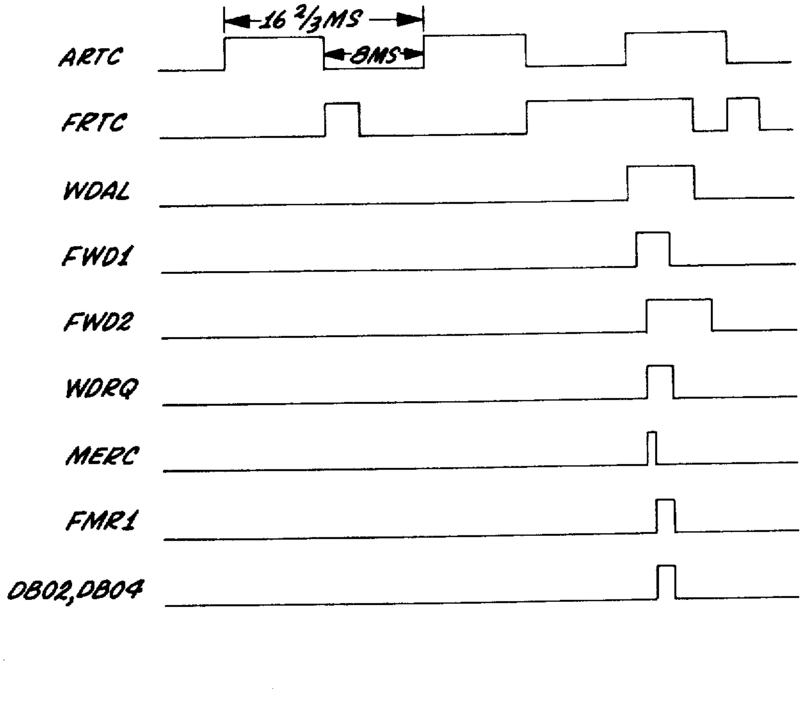
FIGURES 15, 16 and 17 are timing diagrams illustrating the operation of the interrupt monitor apparatus of the invention.

FIGURE 15 is a timing diagram illustrating the operation of Interrupt Monitor 150 in response to detection of an interrupt error by interrupt monitor input gate 160. Referring to FIGURE 15, level change detector flip-flop RTC, shown in FIGURE 9, is set on the falling edge of each positive pulse of 60 cycle per second signal ARTC, indicating the presence of an interrupt request to Automatic Program Interrupt Unit 15. The first interrupt request illustrated in FIGURE 15 is serviced and flip-flop RTC is reset to the 0-state.

The second interrupt request stored in flip-flop RTC has not been serviced prior to occurrence of the leading or rising edge of the positive portion of the 60 cycle per second signal ARTC or approximately 8 milliseconds after occurrence of the interrupt request. This condition causes interrupt monitor input gate 160 to be enabled to provide signals WD01 and WDAL, indicating detection of an interrupt error. The frequency and waveform of signal ARTC may be varied to provide any desired time interval between the occurrence of an interrupt request and enabling of an input gate of Interrupt Monitor 150. Signal WDAL causes flip-flop WD1 to be set to the 1-state, output signal FWD1 causing flip-flop WD2 to be immediately set to the 1-state, as illustrated in FIGURE 15. Signal WDRQ issues in response to the signal combination FWD1 FWD2 to cause generation of signal MERC, holding the system in Sequence Control State 1 and setting flip-flop MR1 to inhibit normal addressing of Memory 11, and to cause the address of memory storage location $00024_8$ to be transferred to Memory 11. Correction of the error condition detected by interrupt monitor input gate 160 is initiated by the SPB instruction stored in storage location $00024_8$ and flip-flops WD1 and MR1 are reset to the 0-state. Upon completion of servicing of the interrupt request, indicating that the interrupt error condition has been corrected, level change detector flip-flop RTC and flip-flop WD2 are reset to the 0-state.

At the next trailing edge of 60 cycle per second signal ARTC, level change detector flip-flop RTC is again set to the 1-state to store the program interrupt request and the request is subsequently serviced in a normal manner. As illustrated in the timing diagram, recognition by Interrupt Monitor 150 of failure of the interrupt request stored in flip-flop RTC to be serviced by the time the leading edge of the 60 cycle per second clock signal ARTC again occurs permits the interrupt request to be serviced prior to occurrence of the next interrupt request, preventing loss of information, in this case real-time information, in the system.

Figure 16:
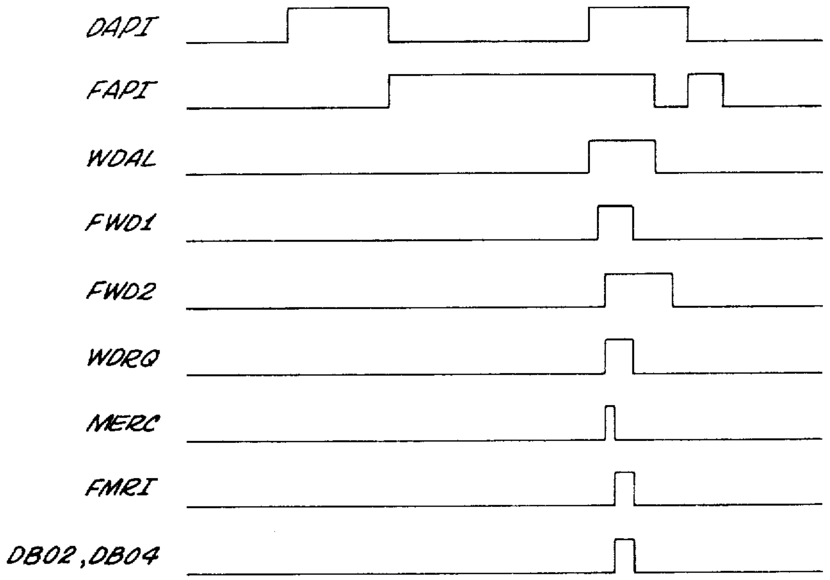

FIGURE 16 is a timing diagram illustrating the operation of Interrupt Monitor 150 in response to detection of an interrupt error by interrupt monitor input gate 162. The operation of Interrupt Monitor 150 in response to enabling of input gate 162 is similar to that initiated by enabling of input gate 160, as described above. Interrupt request signal DAPI occurs intermittently as opposed to the periodic 60 cycle per second signal ARTC. In response to detection of an interrupt error by input gate 162, Interrupt Monitor 150 causes the interrupt request to be serviced, as described above, prior to occurrence of a subsequent identical interrupt request.

Figure 17:
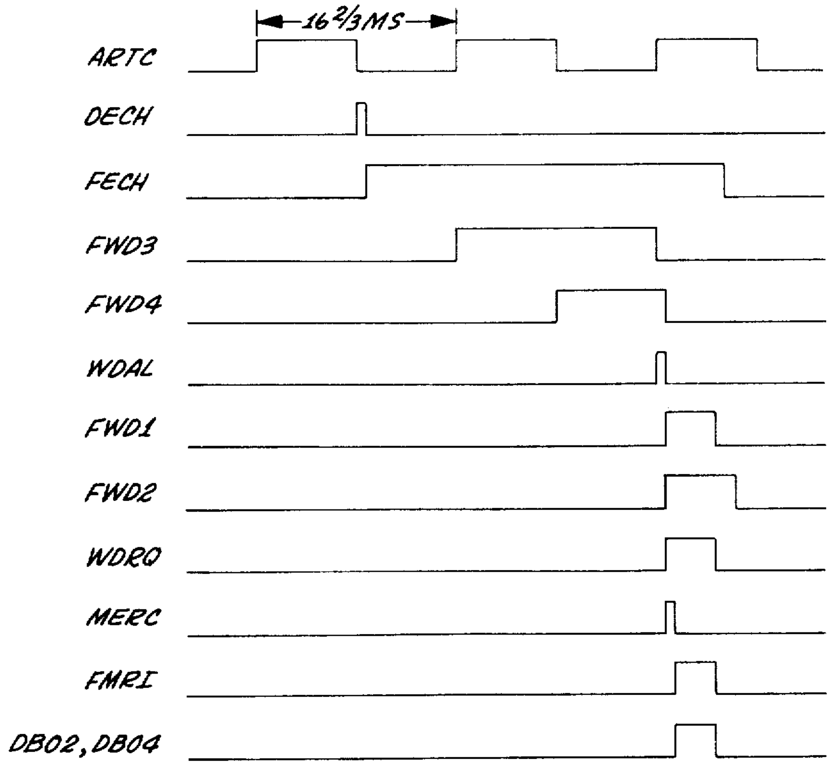

FIGURE 17 is a timing diagram illustrating operation of Interrupt Monitor 150 in response to detection of an interrupt error by interrupt monitor input gate 163.

The program interrupt initiated by interrupt request signal ARTC is employed to execute a Decrement Memory and Test (DMT) instruction to periodically decrement a counter in a predetermined memory location, the counter serving as a source of real-time clock information in the system. Each time the counter is decremented from 0 to −1 in response to execution of a DMT instruction, echo signal WECO issues, as described in the section entitled "Automatic Program Interrupt Unit." If the decrementation of the counter from a count of 0 to a count of −1 occurs during a program interrupt, as opposed to occurrence during execution of the main program, interrupt request signal DECH issues to interrupt the main program, so that a subroutine for resetting the real-time counter to an initial count may be executed. In response to the falling edge of interrupt request signal DECH, level change detector flip-flop ECH is set to the 1-state. At the rising edge of the next 60 cycle per second signal ARTC, flip-flop WD3 is set to the 1-state. Flip-flop WD4 is set to the 1-state at the filling edge of the ARTC signal. At the rising edge of the subsequent ARTC signal, flip-flop WD3 is reset to the 0-state. In response to output signal FECH of the level change detector, $\overline{FWD3}$ of flip-flop WD3 and FWD4 of flip-flop WD4, interrupt monitor input gate 163 is enabled, causing generation of signal WDAL. Signal WDAL causes flip-flops WD1 and WD2 to be set to the 1-state generating interrupt error signal WDRQ. Signal WDRQ causes signal MERC to issue, holding the system in Sequence Control State 1 and setting flip-flop MRI to the 1-state to inhibit normal addressing of Memory 11 from Arithmetic and Control Unit 10, and causes the address of memory storage location $00024_8$ to be transmitted to Memory 11. The SPB instruction stored in memory location $00024_8$ initiates a subroutine permitting the interrupt request represented by signal FECH to be serviced. Flip-flops MRI and WD1 are reset to the 0-state upon execution of the SPB instruction. Flip-flop ECH in subsequently reset to the 0-state upon initiation of servicing of the interrupt request. Flip-flop WD2 is reset to the 0-state upon completion of servicing of a program interrupt request.

Accordingly, there has been described herein computer apparatus embodying the instant invention. While the principles of the invention have now been made clear in an illustrative embodiment, there will be immediately obvious to those skilled in the art many modifications in structure, arrangement, proportions, elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a computer system including a memory for storing information and an arithmetic and control unit for normally executing a main program, the combination comprising: signal means for generating a request to interrupt the main program being executed by the arithmetic and control unit, program interrupt means normally responsive to the program interrupt request generated by said signal means for servicing the program interrupt request by interrupting the main program being executed by the arithmetic and control unit, and timing means connected to said signal means and responsive to detection of the failure of said program interrupt means to service the program interrupt request generated by said signal means within a predetermined period for providing an error signal.

2. In a computer system including a memory for storing information and an arithmetic and control unit for normally executing a main program, the combination comprising: signal means for generating a request to interrupt the main program being executed by the arithmetic and control unit, program interrupt means normally responsive to the program interrupt request generated by said signal means for servicing the program interrupt request by interrupting the main program being executed by the arithmetic and control unit, timing means connected to said signal means responsive to detection of the failure of said program interrupt means to service the program interrupt request generated by said signal means within a predetermined period for providing an error signal, and means responsive to the error signal provided by said timing means for causing the current program interrupt request generated by said signal means to be serviced prior to generation of the next program interrupt request by said signal means.

3. In a computer system including a memory having a plurality of storage locations for storing information and an arithmetic and control unit for normally executing a main program, the combination comprising: signal means for generating a request to interrupt the main program being executed by the arithmetic and control unit, program interrupt means normally responsive to the program interrupt request generated by said signal means for servicing the program interrupt request by interrupting the main program being executed by the arithmetic and control unit, timing means connected to said signal means responsive to detection of the failure of said program interrupt means to service the program interrupt request generated by said signal means within a predetermined time for providing an error signal, and means responsive to the error signal provided by said timing means for causing the contents of a predetermined storage location of the memory to be transferred to the arithmetic and control unit.

4. The combination of claim 3 including means responsive to the contents of the predetermined storage location of the memory for causing the program interrupt request generated by said signal means to be serviced.

5. In a computer system including a memory having a plurality of storage locations for storing information and an arithmetic and control unit for normally executing a main program, the combination comprising: signal means for periodically generating a request to interrupt the main program being executed by the arithmetic and control unit, program interrupt means normally responsive to the program interrupt request generated by said signal means for servicing the program interrupt request by interrupting the main program being executed by the arithmetic and control unit, and timing means connected to said signal means and responsive to detection of the failure of said program interrupt means to service the program interrupt request generated by said signal means within a predetermined time less than the time between successive interrupt requests generated by said signal means for providing an error signal.

6. In a computer system, the combination of claim 5 including means responsive to the error signal provided by said timing means for causing the current program interrupt request generated by said signal means to be serviced prior to generation of the next program interrupt request by said signal means.

7. In a computer system including a memory having a plurality of storage locations for storing information and an arithmetic and control unit for normally executing a main program, the combination comprising: signal means for generating a request to interrupt the main program being executed by the arithmetic and control unit, program interrupt means normally responsive to the program interrupt request generated by said signal means for servicing the program interrupt request by interrupting the main program being executed by the arithmetic and control unit, timing means connected to said signal means responsive to detection of the failure of said program interrupt means to service the program interrupt request generated by said signal means within a predetermined time for providing an error signal, first means responsive to the error signal provided by said timing means for causing the contents of a predetermined storage location of the memory to be transferred to the arithmetic and control unit, and second means responsive to the error signal provided by said timing means for inhibiting normal execution of the main program by the arithmetic and control unit.

8. The combination of claim 7 including means responsive to the contents of the predetermined storage location of the memory for causing the program interrupt request to be serviced.

9. In a computer system including a memory for storing information and an arithmetic and control unit for normally executing a main program, the combination comprising: first signal means for generating a first request to interrupt the main program being executed by the arithmetic and control unit, second signal means for generating a second request to interrupt the main program being executed by the arithmetic and control unit, program interrupt means normally responsive to the program interrupt requests generated by said first and second signal means for servicing the program interrupt requests by interrupting the main program being executed by the arithmetic and control unit, and timing means connected to said signal means responsive to the detection of the failure of said program interrupt means to service a program interrupt request generated by said first signal means within a first predetermined period or to service a program interrupt request generated by said second signal means within a second predetermined period for providing an error signal.

10. The combination of claim 9 which includes means responsive to the error signal provided by said timing means for causing the current program interrupt request generated by said signal means to be serviced.

11. In a computer system including a memory having a plurality of storage locations for storing information and an arithmetic and control unit for normally executing a main program, the combination comprising: first signal means for generating a first request to interrupt the main program being executed by the arithmetic and control unit, second signal means for generating a second request to interrupt the main program being executed by the arithmetic and control unit, program interrupt means normally responsive to the program interrupt requests generated by said signal means for servicing the program interrupt requests by interrupting the main program being executed by the arithmetic and control unit, timing means connected to said signal means responsive to detection of a failure of said program interrupt means to service a program interrupt request generated by said first signal means within a first predetermined period and responsive to detection of the failure of said program interrupt means to service a program interrupt request generated by said second signal means within a second predetermined period for providing an error signal, and means responsive to the error signal provided by said timing means for causing the contents of a predetermined storage location of the memory to be transferred to the arithmetic and control unit.

12. The combination of claim 11 which includes means responsive to the contents of the predetermined storage location of the memory for causing a program interrupt request generated by said first or second signal means to be serviced prior to generation of the next program interrupt request by said first or second signal means respectively.

13. In a computer system including a memory having a plurality of storage locations for storing information and an arithmetic and control unit for normally executing a main program, the combination comprising: first signal means for periodically generating a request to interrupt the main program being executed by the arithmetic and control unit, second signal means for periodically generating a request to interrupt the main program being executed by the arithmetic and control unit, program interrupt means normally responsive to the program interrupt requests generated by the said first and second signal means for servicing the program interrupt requests by interrupting the main program being executed by the arithmetic and control unit, and timing means connected to said signal means and responsive to detection of a failure of said program interrupt means to service a program interrupt request generated by said first signal means within a first predetermined time less than the time between successive interrupt requests generated by said first signal means and responsive to detection of a failure of said program interrupt means to service a program interrupt request generated by said second signal means within a second predetermined time less than the time between successive interrupt requests generated by said second signal means for providing an error signal.

14. The combination of claim 13 including means responsive to the error signal provided by said timing means for causing a current program interrupt request generated by said first or second signal means to be serviced prior to generation of the next program interrupt request by said first or second signal means.

15. In a computer system including a memory having a plurality of storage locations for storing information and an arithmetic and control unit for normally executing a main program, the combination comprising: first signal means for periodically generating a request to interrupt the main program being executed by the arithmetic and control unit, second signal means for periodically generating a request to interrupt the main program being executed by the arithmetic and control unit, program interrupt means normally responsive to program interrupt requests generated by said first and second signal means for servicing the program interrupt requests by interrupting the main program being executed by the arithmetic and control unit, first timing means connected to said first signal means responsive to detection of a failure of said program interrupt means to service a program interrupt request generated by said first means within a first predetermined period for providing an error signal, second timing means connected to said second signal means responsive to detection of a failure of said program interrupt means to service a program interrupt request generated by said second signal means within a second predetermined period for providing an error signal, first and second flip-flops, means responsive to an error signal provided by one of said first and second timing means for causing each of said first and second flip-flops to assume a first state, logic means responsive to the first states of said first and second flip-flops for interrupting execution of the main program in the arithmetic and control unit and for causing the contents of a predetermined storage location of the memory to be transferred to the arithmetic and control unit to permit servicing of the interrupt request causing generation of the error signal by one of said timing means, means responsive to operation of said logic means for causing said first flip-flop to assume a second state, means for causing said second flip-flop to remain in the first state until a program interrupt request provided is serviced, and means responsive to the first state of said second flip-flop for preventing said first flip-flop from entering the first state.

References Cited

UNITED STATES PATENTS

| | | | |
|---|---|---|---|
| 3,293,610 | 12/1966 | Epperson et al. ---- | 340—172.5 |
| 3,226,694 | 12/1965 | Wise ------------- | 340—172.5 |

PAUL J. HENON, Primary Examiner

R. F. CHAPURAN, Assistant Examiner

Notice of Adverse Decision in Interference

In Interference No. 98,400 involving Patent No. 3,504,347, S. A. Harmon and E. A. Herrera, INTERRUPT MONITOR APPARATUS IN A COMPUTER SYSTEM, final judgment adverse to the patentees was rendered Feb. 11, 1974, as to claims 1, 3 and 7.

[*Official Gazette May 21, 1974.*]